US010755049B2

(12) United States Patent
Suzuki et al.

(10) Patent No.: US 10,755,049 B2
(45) Date of Patent: Aug. 25, 2020

(54) EXTRACTION OF A KEYWORD IN A CLAIM

(71) Applicant: INTERNATIONAL BUSINESS MACHINES CORPORATION, Armonk, NY (US)

(72) Inventors: Shoko Suzuki, Yokohama (JP); Hiromichi Takatsuka, Fujisawa (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 464 days.

(21) Appl. No.: 15/593,763

(22) Filed: May 12, 2017

(65) Prior Publication Data
US 2017/0351662 A1    Dec. 7, 2017

(30) Foreign Application Priority Data

Jun. 3, 2016 (JP) .................................. 2016-112228

(51) Int. Cl.
*G06F 16/338* (2019.01)
*G06F 16/33* (2019.01)
(Continued)

(52) U.S. Cl.
CPC ............ *G06F 40/30* (2020.01); *G06F 16/338* (2019.01); *G06F 16/3344* (2019.01);
(Continued)

(58) Field of Classification Search
CPC ...................................................... G06F 17/21
(Continued)

(56) References Cited

U.S. PATENT DOCUMENTS 9,645,999 B1 * 5/2017 Ciulla ................. G06F 17/2785
2005/0050469 A1 * 3/2005 Uchimoto ............. G06F 17/271
715/256
(Continued)

FOREIGN PATENT DOCUMENTS

CN        105426546 A    3/2016
JP      2003196280 A    7/2003
(Continued)

OTHER PUBLICATIONS

Chen, Yiqun, "Novel Word Features for Keyword Extraction", Web-Age Information Management vol. 9098 of the series Lecture Notes in Computer Science, pp. 148-160, Jun. 6, 2015 <http://link.springer.com/chapter/10.1007/978-3-319-21042-1_12/>.
(Continued)

*Primary Examiner* — Huyen X Vo
*Assistant Examiner* — Timothy Nguyen
(74) *Attorney, Agent, or Firm* — Cantor Colburn LLP; Joseph Petrokaitis

(57) ABSTRACT

Extracting one or more keywords in a claim, including: decomposing an independent claim into a plurality of elements, wherein each element in the plurality of elements has at least one term; constructing a dependency structure from the plurality of elements, wherein each element in the plurality of elements has a depth in the dependency structure; calculating a score using the depth of the element corresponding to the at least one term in the independent claim; and extracting at least one keyword from the at least one term having a score equal to or larger than a predetermined threshold.

24 Claims, 15 Drawing Sheets

(51) Int. Cl.
*G06F 16/36* (2019.01)
*G06F 40/30* (2020.01)
*G06F 40/205* (2020.01)
*G06F 40/253* (2020.01)

(52) U.S. Cl.
CPC ............ *G06F 16/36* (2019.01); *G06F 40/205* (2020.01); *G06F 40/253* (2020.01)

(58) Field of Classification Search
USPC .............................................. 704/9
See application file for complete search history.

(56) References Cited

U.S. PATENT DOCUMENTS

| | | | | |
|---|---|---|---|---|
| 2008/0154848 | A1* | 6/2008 | Haslam | G06F 16/93 |
| 2009/0164404 | A1* | 6/2009 | Sampath | G06N 20/00 706/46 |
| 2009/0177463 | A1* | 7/2009 | Gallagher | G06F 16/313 704/10 |
| 2011/0078167 | A1* | 3/2011 | Sundaresan | G06F 17/2785 707/765 |
| 2012/0317041 | A1* | 12/2012 | Shaffer | G06Q 90/00 705/310 |
| 2015/0066477 | A1* | 3/2015 | Hu | G06F 17/2785 704/9 |
| 2015/0178272 | A1* | 6/2015 | Geigel | G06F 16/35 704/9 |
| 2017/0147544 | A1* | 5/2017 | Modani | G06F 17/24 |
| 2017/0147635 | A1* | 5/2017 | McAteer | G06F 16/9024 |
| 2017/0344533 | A1* | 11/2017 | Tsai | G06F 17/2775 |

FOREIGN PATENT DOCUMENTS

| | | |
|---|---|---|
| JP | 2004094528 A | 3/2004 |
| JP | 2005174003 A | 6/2005 |
| JP | 2008026964 A | 2/2008 |
| JP | 2012003517 A | 1/2012 |
| WO | 2010103916 A1 | 9/2010 |

OTHER PUBLICATIONS

Verma, Manisha, "Applying Key Phrase Extraction to Aid Invalidity Search", ICAIL '11 Proceedings of the 13th International Conference on Artificial Intelligence and Law, pp. 249-255, Jun. 6-10, 2011, ACM, New York, NY <http://www0.cs.ucl.ac.uk/staff/M.Verma/files/icail_paper.pdf/>.

Noh, Heeyong, "Keyword Selection and Processing Strategy for Applying Text Mining to Patent Analysis", Expert Systems with Applications, vol. 42, Issue 9, Jun. 1, 2015, pp. 4348-4360, Elsevier Ltd., <http://www.sciencedirect.com/science/article/pii/S0957417415000652/>.

* cited by examiner

[Element 1]
311 — a substrate made of semiconductor

[Element 2]
312 — a structure formed on the substrate and has an active layer made of semiconductor between a pair of layers made of semiconductor

[Element 3]
313 — each of the layers is made of the semiconductor having a gap broader than an energy corresponding to a peak wavelength of a spectrum of the active layer

[Element 4]
314 — a trap layer disposed between the substrate and the structure

[Element 5]
315 — a peak wavelength of a spectrum of the trap layer is longer than a wavelength corresponding to a band gap of the substrate and the peak wavelength of the spectrum of the active layer

[Element 6]
316 — a plurality of electrodes used for injecting current into the active layer

[Element 7]
317 — an absorption layer disposed between the substrate and the trap layer

[Element 8]
318 — a peak wavelength of a spectrum of the absorption layer is shorter than that corresponding to the band gap and shorter than the peak wavelength of the spectrum of the active layer

701

| Methods | MAP |
|---|---|
| Example-1 | 0.5690 |
| Example-2 | 0.5834 |
| Comparative-1 | 0.3364 |
| Comparative-2 | 0.3696 |
| Comparative-3 | 0.4641 |
| Comparative-4 | 0.4660 |
| Comparative-5 | 0.4847 |

702

| Methods | precision | recall | f-measure |
|---|---|---|---|
| Example-1 | 0.4704 | 0.3191 | 0.3802 |
| Example-2 | 0.4835 | 0.3191 | 0.3844 |
| Comparative-1 | 0.2045 | 0.0759 | 0.1107 |
| Comparative-2 | 0.2633 | 0.0977 | 0.1426 |
| Comparative-3 | 0.3923 | 0.6722 | 0.4954 |
| Comparative-4 | 0.3589 | 0.2327 | 0.2823 |
| Comparative-5 | 0.3850 | 0.2565 | 0.3079 |
| Baseline: Uniform | 0.3195 | 0.9793 | 0.4818 |

Fig. 7

EXTRACTION OF A KEYWORD IN A CLAIM

BACKGROUND

The present invention relates to keyword extraction and, more specifically, to an extraction of a keyword in a claim.

Recently, the need for patent analysis is growing. The patent analysis is carried out for the purpose of detecting technical trends, hidden needs, competitors strategies, important technologies, or related patents to the company-owned technologies.

A patent analysis is carried out using text mining techniques, such as Natural Language Processing (NLP) based approaches, semantic analysis based approaches, rules based approached, property-function based approaches, and neural networks based approaches.

Various approaches for the patent analysis are proposed by the following Patent Literatures [1] and [2] and Non-patent Literatures [A] to [I]. However, there is no technique for extracting a keyword from a patent document with a high accuracy.

[1] US 2015/0178272 A1
[2] CN 105426546 A
[A] Toru Takaki et. al., "Associative Document Retrieval by Query Subtopic Analysis and its Application to Invalidity Patent Search", ACM New York, Proceeding CIKM '04 Proceedings of the thirteenth ACM international conference on Information and knowledge management, pp. 399-405, November 2004.
[B] Fu-ren Lin et. al., "The Study of Patent Prior Art Retrieval Using Claim Structure and Link Analysis", PACIS 2010 Proceedings, July 2010.
[C] Assad Abbas, "A literature review on the state-of-the-art in patent analysis", Word Patent Information, Volume 37, pp. 3-13, June 2014.
[D] Akihiko Shinmori et. al., "Rhetorical Structure Analysis of Japanese Patent Claims using Cue Phrases", Proceedings of the third NTCIR Workshop, pp. 69-77, 2013.
[E] Svetlana Sheremetyeva, "Natural Language Analysis of Patent Claims", Proceeding PATENT '03 Proceedings of the ACL-2003 workshop on Patent corpus processing, Volume 20, pp. 66-73, 2003.
[F] Yiqun Chen et. al., "Novel word features for keyword extraction", Web-Age Information Management, Volume 9098 of the series Lecture Notes in Computer Science, pp. 148-160, Jun. 6, 2015.
[G] Manisha Verma et. al., "Applying key phrase extraction to aid invalidity search", Proceeding ICAIL '11 Proceedings of the 13th International Conference on Artificial Intelligence and Law, pp. 249-255, 2011.
[H] Heeyong Noh et. al., "Keyword selection and processing strategy for applying text mining to patent analysis", Expert Systems with Applications, ELSEVIER, Volume 42 (9), pp. 4348-4360, Jun. 1, 2015.
[I] Svetlana. Sheremetyeva et. al., "Generating patent claims from interactive input", Proceedings of the 8th. International Workshop on Natural Language Generation (INLG '96), pp. 61-70, June 1996

SUMMARY

According to one aspect of the present invention, a computer-implemented method for extracting one or more keywords in a claim is provided. In one embodiment, the method includes decomposing an independent claim into a plurality of elements each of which includes one or more terms; constructing a dependency structure from the plurality of elements, each of the plurality of elements having a depth in the dependency structure; for each of terms in the independent claim, calculating a score using a depth of an element corresponding to the term; and extracting, as one or more keywords, one or more terms having a score equal to or larger than a predetermined threshold.

According to another aspect of the present invention, a computer-implemented method for extracting one or more keywords in a claim is provided. The method includes: parsing an independent claim to extract representative terms, each of the representative terms being a noun, numeral, verb, adjective or adverb; specifying, from the plurality of the representative terms, one or more representative terms with which each of one or more dependent claims has a dependency relation; associating each of the one or more dependent claims with the one or more specified representative terms; for each of representative terms in the independent claim, calculating a score using the number of dependent claims associated with the representative term; and extracting, as one or more keywords, one or more representative terms having a score equal to or larger than a predetermined threshold.

According to another aspect of the present invention, a system is provided. The system includes: a memory storing a program which, when executed on a processor, performs an operation for extracting one or more keywords in a claim, the operation includes: decomposing an independent claim into a plurality of elements each of which includes one or more terms; constructing a dependency structure from the plurality of elements, wherein each of the plurality of elements has a depth in the dependency structure; for each of terms in the independent claim, calculating a score using a depth of an element corresponding to the term; and extracting, as one or more keywords, one or more terms having a score equal to or larger than a predetermined threshold.

According to another aspect of the present invention, a computer program product for extracting one or more keywords in a claim is provided. The computer program product includes a computer usable storage medium having program instructions embodied therewith, wherein the computer readable storage medium is not a transitory signal per se, the program instructions executable by a computer to cause the computer to perform a method including: decomposing an independent claim into a plurality of elements each of which includes one or more terms; constructing a dependency structure from the plurality of elements, wherein each of the plurality of elements has a depth in the dependency structure; for each of terms in the independent claim, calculating a score using a depth of an element corresponding to the term; and extracting, as one or more keywords, one or more terms having a score equal to or larger than a predetermined threshold.

BRIEF DESCRIPTION OF THE DRAWINGS

FIGS. 3A and 3B illustrates one embodiment of a dependency structure which is made from an independent claim and optionally dependent claims.

FIG. 7 illustrates a result obtained from an embodiment of the present invention.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

To define more clearly the terms used herein, the following exemplified definitions are provided, but the meaning of the terms should be interpreted broadly as known to the technical field to which the present invention relates.

The term "claim" refers to a patent claim which is described in a document, such as a patent application, a patent, or a patent related document, for example a web document, a search result or a report on a license or patentability. A claim can be written using any language. The claim is divided into two groups: an independent claim and a dependent claim.

The term "independent claim" refers to a standalone claim that does not refer any other claim. The independent claim may have a preamble or introduction part included in the claim.

The term "dependent claim" refers to a claim that depends on one or more claims.

The term "term" refers to a word or words described in a claim. The term may also be a meaningful word.

The term "element" refers to a unit which is a result of decomposing a claim into a plurality of structural elements. Each element includes one or more terms.

The term "representative term" refers to a noun, a verb, an adjective, or an adverb, or combination of these among terms included in an element. The representative word also may be a term which representative of an element. The noun may also be a word that is the name of something and includes a numeral.

The term "overlapping term" refers to a common or similar term which appears, for example, between elements of an independent claim; between an element of an independent claim and a dependent claim; between an element of an independent claim and a dependent claim; or between elements of a dependent claim. The similar term may be, for example, terms which have the same meaning, such as "the" and "said", a singular form and a plural form; or numerical value ranges which overlap each other. The similar term may be defined in advance by a user.

The term "modifying term" refers to a term which modifies each of the terms in a claim.

Figure 1:
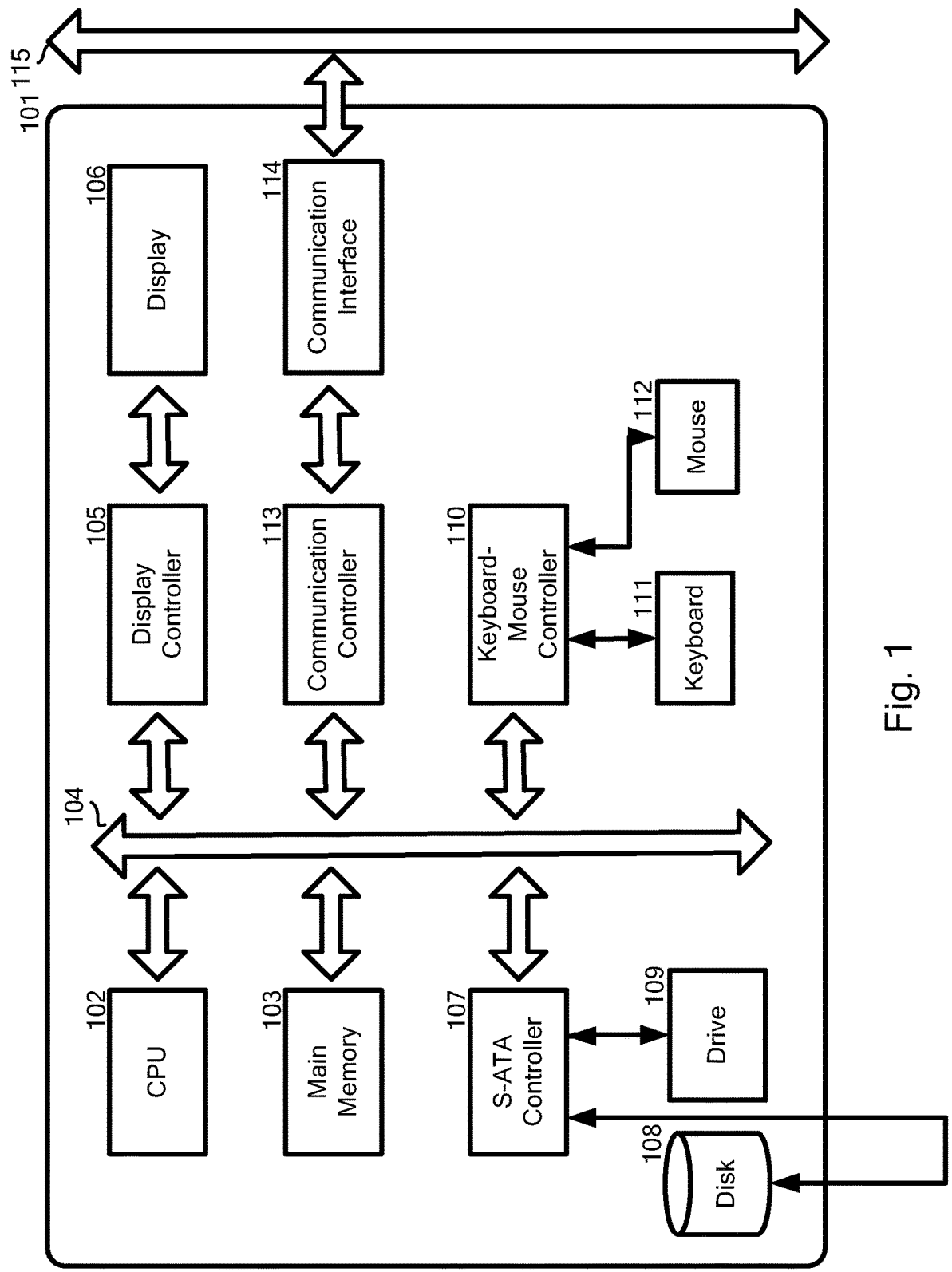
FIG. 1 illustrates an exemplified basic block diagram of a computer hardware used in an embodiment of the present invention.

With reference now to FIG. 1, FIG. 1 illustrates an exemplified basic block diagram of a computer hardware used in an embodiment of the present invention.

A computer (101) may be, for example, but is not limited to, a desktop, a laptop, a notebook, a tablet or a server computer. The server computer may be, for example, but is not limited to, a workstation, a rack-mount type server, a blade type server, or a mainframe server and may run, for example, a hypervisor for creating and running one or more virtual machines. The computer (101) may include one or more CPUs (102) and a main memory (103) connected to a bus (104). The CPU (102) may be preferably based on a 32-bit or 64-bit architecture. The CPU (102) may be, for example, but is not limited to, the Power® series of International Business Machines Corporation; the Core i™ series, the Core 2™ series, the Atom™ series, the Xeon™ series, the Pentium® series, or the Celeron® series of Intel Corporation; or the Phenom™ series, the Athlon™ series, the Turion™ series, or Sempron™ of Advanced Micro Devices, Inc. ("Power" is registered trademark of International Business Machines Corporation in the United States, other countries, or both; "Core i", "Core 2", "Atom", and "Xeon" are trademarks, and "Pentium" and "Celeron" are registered trademarks of Intel Corporation in the United States, other countries, or both; "Phenom", "Athlon", "Turion", and "Sempron" are trademarks of Advanced Micro Devices, Inc. in the United States, other countries, or both).

A display (106) such as a liquid crystal display (LCD) may be connected to the bus (104) via a display controller (105). The display (106) may be used to display, for management of the computer(s), information on a computer connected to a network via a communication line and information on software running on the computer using an appropriate graphics interface. A disk (108) such as a hard disk or a solid state drive, SSD, and a drive (109) such as a CD, a DVD, or a BD (Blu-ray disk) drive may be connected to the bus (104) via an SATA or IDE controller (107). Moreover, a keyboard (111) and a mouse (112) may be connected to the bus (104) via a keyboard-mouse controller (110) or USB bus (not shown).

An operating system, programs providing Windows®, UNIX® Mac OS®, Linux®, or a Java® processing environment, Java® applications, a Java® virtual machine (VM), and a Java® just-in-time (JIT) compiler, such as J2EE®, other programs, and any data may be stored in the disk (108) to be loadable to the main memory. ("Windows" is a registered trademark of Microsoft corporation in the United States, other countries, or both; "UNIX" is a registered trademark of the Open Group in the United States, other countries, or both; "Mac OS" is a registered trademark of Apple Inc. in the United States, other countries, or both; "Linux" is a registered trademark of Linus Torvalds in the United States, other countries, or both; and "Java" and "J2EE" are registered trademarks of Oracle America, Inc. in the United States, other countries, or both).

The drive (109) may be used to install a program, such as the computer program of an embodiment of the present invention, readable from a CD-ROM, a DVD-ROM, or a BD to the disk (108) or to load any data readable from a CD-ROM, a DVD-ROM, or a BD into the main memory (103) or the disk (108), if necessary.

A communication interface (114) may be based on, for example, but is not limited to, the Ethernet® protocol. The communication interface (114) may be connected to the bus (104) via a communication controller (113), physically connects the computer (101) to a communication line (115), and may provide a network interface layer to the TCP/IP communication protocol of a communication function of the operating system of the computer (101). In this case, the communication line (115) may be a wired LAN environment or a wireless LAN environment based on wireless LAN connectivity standards, for example, but is not limited to, IEEE® 802.11a/b/g/n ("IEEE" is a registered trademark of Institute of Electrical and Electronics Engineers, Inc. in the United States, other countries, or both).

Hereinafter, an embodiment of the present invention will be described with reference to the following FIGS. 2A to 2E, FIGS. 3A and 3B, FIG. 4, FIGS. 5A and 5B, FIG. 6, FIG. 7, and FIGS. 8A and 8B.

Various embodiments of the present invention operate on the basis of the following perceptions: (1) keywords in a claim tend to exist in a part in an independent claim that are limited by a dependent claim(s); and (2) keywords in a claim tend to exist in a bottom of a dependency structure made from an independent claim and optionally one or more dependent claims. These perceptions can be obtained from features of an independent and one or more dependent claims.

FIGS. 2A to 2E illustrate one embodiment of a flowchart of a process for extracting one or more keywords in a claim.

The following notations which are summarized in Table 1 are used in the following explanation.

TABLE 1

| | |
|---|---|
| $\{e_i\}$ | a set of element sequentially derived from an independent claim, where i denotes an order, or ID, of the element; |
| $e(\omega)$ | a first element in $\{e_i\}$ where term $\omega$ appears; |
| $d(e_i)$ | a depth of element $e_i$ in a dependency structure; |
| $t_0$ | an overlapping term that connects dependency relation between an element - element in an independent claim or between an element in an independent claim - an element in a dependent claim or dependent claim itself; |
| $ET(e_i)$ | a mapping from a child element $e_i$ to $t_0$; |
| $DT(c_i)$ | a mapping from a dependent claim $c_i$ to $t_0$; |
| parent($e_i$) | a parent element of $e_i$; |
| $T_0$ | a set of all $t_0$; |
| ncl($t_0$) | the number of dependent claims $DT^{-1}(t_0)$; |
| Mod(m) | a mapping to $\{t_0\}$ that a modifying term, m, modifies |

A system such as the computer (101) performs each of the steps described in each of FIGS. 2A to 2E. The computer may be implemented as a single computer or multiple computers.

Suppose that a storage (291) described in each of FIGS. 2A to 2E stores one or more documents having at least one independent claim. The storage (291) may be a storage embedded in the computer or a storage connected to the computer via an intranet or internet, such as a network attached storage, i.e. NAS.

Figure 2A:
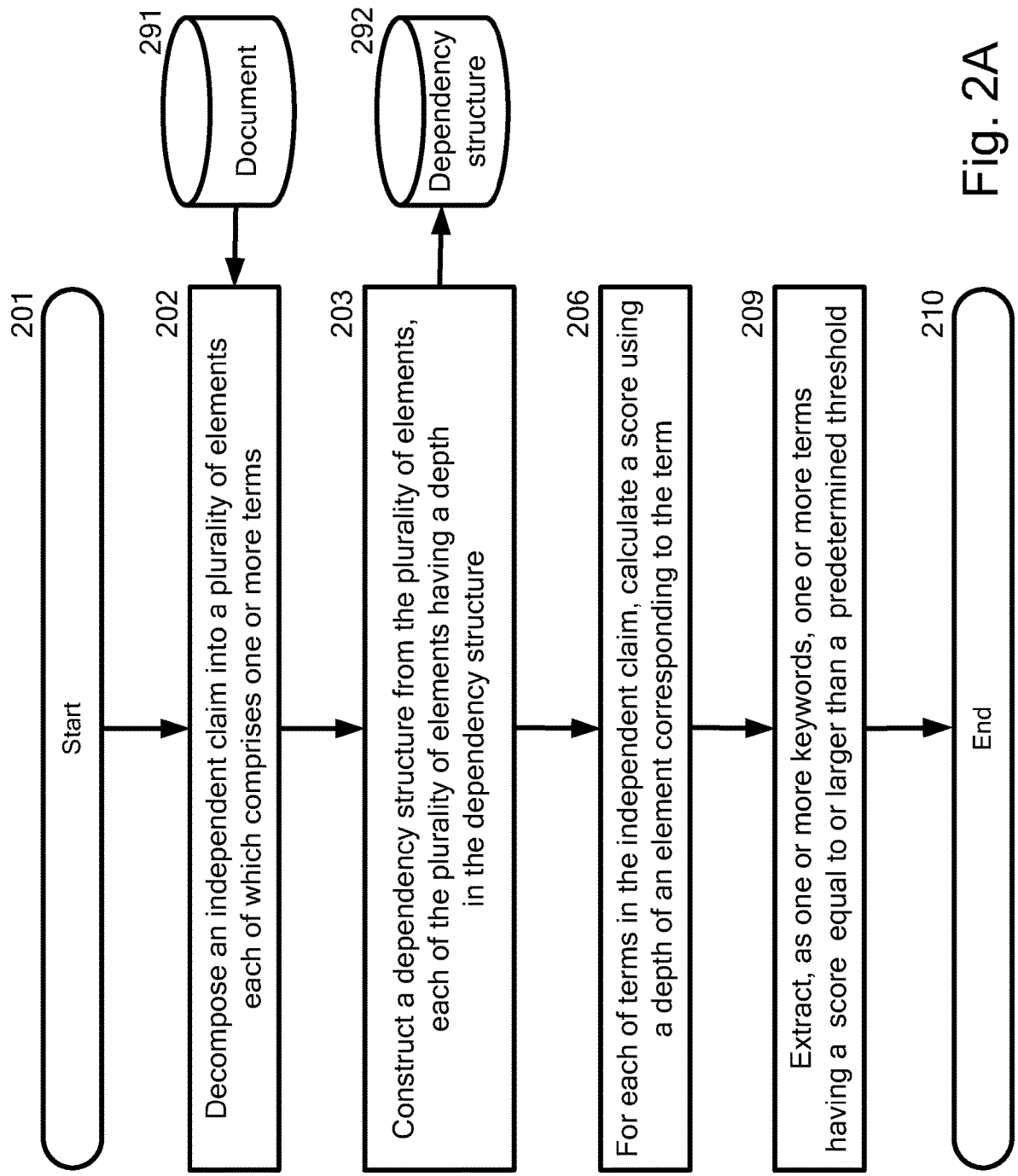
FIGS. 2A to 2E illustrate one embodiment of a flowchart of a process for extracting one or more keywords in a claim.

With reference now to FIG. 2A, FIG. 2A illustrates one embodiment of a flowchart of a process for extracting one or more keywords in a claim, using an independent claim and a dependency structure which is constructed only from the independent claim.

In step 201, the computer starts the process for extracting one or more keywords in a claim.

In step 202, the computer reads, into a memory such as a main memory (103) described in FIG. 1, a document from the storage (291) and then decomposes an independent claim in the document into a plurality of elements to obtain a set of elements. Each of the plurality of elements includes one or more terms.

The independent claim is decomposed using methods, such as POS tags. For example, the decomposition is made by a cue phrase such as a delimiter character (i.e., ",", ":" or ";"; a paragraph; or a line break). An element corresponding to a preamble in the independent claim may be removed from the set of elements. This is because the preamble in the independent claim may not have a term relating to a novelty or inventive step. Further, a term such as a relative noun, a relative adverb, a relative adjective or a relative clause may be removed from an element. This is because such term in the independent claim may not relate to a novelty or inventive step. One example of the decomposition of an independent claim will be explained below by referring to FIG. 3A.

In step 203, the computer constructs a dependency structure from the plurality of elements which are generated in step 202. The dependency structure may have hierarchical structure for specifying a dependency relation between elements of an independent claim; between an element of an independent claim and a dependent claim; between an element of an independent claim and a dependent claim; or between elements of a dependent claim. The dependency structure may have nodes each of which corresponds to each of the elements. A node may be connected to another node, using an edge. An edge may represent a dependency relation between the elements such as a parent node (or an upper node) and a child node (or a lower node). An edge may have no direction or may have a direction such as from a lower node to an upper node or from an upper node to a lower node. The dependency structure may have one or more top nodes. In a case where the dependency structure has only one top node, the dependency structure may be a tree structure. In the dependency structure, each of the plurality of elements has a depth in the dependency structure. The depth refers to an order from a top node. The depth of a top node may be set to zero. In a case where a planarity of top nodes exists, the depth of all top nodes may be set to the common depth, for example, zero.

Any method known in the art for constructing a dependency structure can be used. The dependency structure may be constructed using a similar manner, such as Rhetorical Structure Theory (RST) for parsing structural elements. In a case where a dependency structure is constructed using RST, each of the elements having a dependency relation has an overlapping term with each other. In a case where a dependency structure is constructed using techniques a different technique, each of elements having a dependency relation may have an overlapping term or a term corresponding to an overlapping term with each other.

In a case where an element and one or more other elements have an overlapping term, a node corresponding to an element which includes the overlapping term appearing first in the sequential order of text of the independent claim is specified as an upper node. Other nodes corresponding to other elements, each of which includes the overlapping term, appear second or after in the sequential order of the texts of the independent claim is specified as a lower node of the upper node. In a case where a dependency structure has an upper node corresponding to an element A, a lower node corresponding to an element B, and the edges between the upper node and the lower node, the element B has a dependency relation with the element A. In a case where the element B has a dependency relation with the element A, the element A and the element B have at least one overlapping term.

For example, the dependency structure is constructed by the following exemplified algorithm shown in Table 2.

TABLE 2

```
d(e₀) ← 0
for i = 1 to i = |{eᵢ}| do
    search e(ω) in eⱼ with j ≤ i for ∀ω ∈ eᵢ
    d(eᵢ) ← -1
    d(eᵢ) max_{ω∈eᵢ} d(e(ω)) + 1
    if d(eᵢ) ≠ 0 then
        t₀ ← argmax d(e(ω))
             ω∈eᵢ
        parent(eᵢ) ← e(t₀)
        ET(eᵢ) ← (t₀)
    end if
end for
```

The dependency structure may be constructed from the set of elements in which the preamble was removed. One example of the dependency structure made from an independent claim will be explained below by referring to FIG. 3A.

In step 206, for each term in the independent claim, the computer calculates a score using a depth of an element corresponding to the term. The phrase, "an element corresponding to the term", refers to an element on which the term appears.

The computer may calculate a score $S_0$ for each of all terms $t_0$ stored in the set $T_0$, using a depth of an element $e(t_0)$. The term for which a score is calculated may be a representative term in each of the elements, such as a noun, a numeral or numeral range, a verb, an adjective, an adverb or a combination of these.

The score for each of the terms in the independent claim may be calculated using the following equation (1):

$$s(t_0)=d(e(t_0))  \quad\quad\quad \text{Equation (1)}$$

In step 209, the computer extracts, as one or more keywords, one or more terms having a score equal to or larger than a predetermined threshold. The predetermined threshold may be determined by a user in advance. The one or more extracted keywords can be displayed on a display 106 (FIG. 1) or printed.

In step 210, the computer terminates the process mentioned above.

According to an embodiment of the flowchart described in FIG. 2A, one or more dependency relations between elements included in an independent claim can be used for extracting a keyword(s) and, therefore, an accuracy of extracting a keyword(s) can be improved.

Figure 2B:
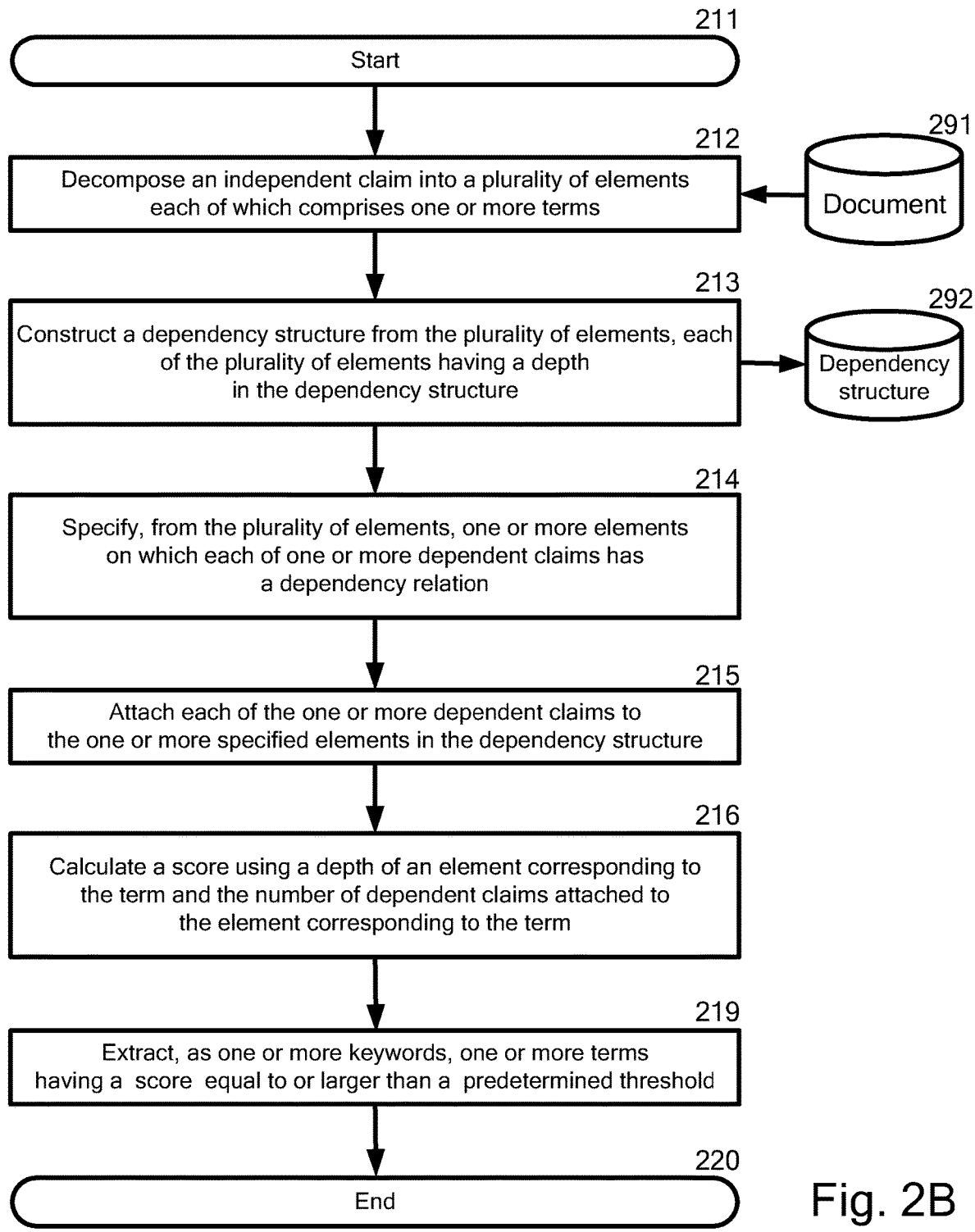

FIG. 2B illustrates one embodiment of a flowchart of a process for extracting one or more keywords in a claim, using an independent claim, its dependent claim(s) and a dependency structure, which is constructed from the independent claim and its dependent claim(s).

In step 211, the computer starts the process for extracting one or more keywords in a claim. Each of steps 212 and 213 corresponds to each of steps 202 and 203, respectively. Accordingly, the overlapping explanations of steps 212 and 213 are omitted here.

In step 214, the computer specifies, from the plurality of elements in the independent claim, one or more elements with which each of one or more dependent claims has a dependency relation.

Where a term in the dependent claim overlaps with one or more terms (that is, overlapping terms) in the element in the independent claim, one or more elements in the independent claim including the overlapping terms are specified as the one or more elements with which each of one or more dependent claims has a dependency relation. The overlapping term may be the same term or a similar term, as defined above.

Where the overlapping term exists in some elements among the plurality of elements, an element appearing first in the sequential order of texts of the independent claim among the elements including the overlapping term is specified as an element with which each of one or more dependent claims has a dependency relation.

Where one or more terms in the element are similar to the term in the dependent claim, the elements including the similar terms are specified, as the one or more elements with which each of one or more dependent claims has a dependency relation, in replace of the elements including the same terms or together with the elements including the same terms.

Where one or more element among the plurality of elements has similarity with an element in a dependent claim, the one or more elements among the plurality of elements are specified, as the one or more elements with which each of one or more dependent claims has a dependency relation.

In step 215, the computer attaches each of the one or more dependent claims to the one or more specified elements in the dependency structure. Using an edge, the attachment is made by connecting a node corresponding to a dependent claim to one or more nodes each of which corresponds to the one or more specified elements in the dependency structure. Further, the computer specifies, from one or more dependent claims that were attached to the element, one or more dependent claims with which each of the remaining one or more dependent claims has a dependency relation. Then, the computer attaches each of the one or more dependent claims to the one or more dependent claims that were already attached to the one or more specified elements. The attachment is made by using an edge to connect a node corresponding to a dependent claim to one or more nodes each of which corresponds to the one or more nodes, each of which corresponds to the one or more dependent claims which were already attached to the one or more specified elements using an edge. Accordingly, the overlapping term $t_0$ is attached to each dependent claim $C_i$ (i.e. $DT(c_i) \leftarrow 0$). One example of the dependency structure made from an independent claim together with dependent claims will be explained below by referring to FIG. 5B.

In step 216, for each of terms in the independent claim, the computer calculates a score using a depth of an element corresponding to the term. The computer may calculate a score $S_0$ for each of all terms $t_0$ stored in the set $T_0$, using a depth of element $e(t_0)$ and the number of dependent claims $ncl(t_0)$ attached to $t_0$. The term for which a score is calculated may be a representative term in each of the elements, such as a noun, a numeral or numeral range, a verb, an adjective, an adverb or a combination of these. The score may be calculated using the following equation (2) or (3):

$$S_{01}(t_0)=d(e(t_0))*(ncl(t_0)+1) \quad\quad \text{Equation (2)}$$

$$S_{02}(t_0)=d(e(t_0))*(\log(ncl(t_0)+1)+1) \quad\quad \text{Equation (3)}$$

In step 219, the computer extracts, as one or more keywords, one or more terms having a score equal to or larger than a predetermined threshold. The predetermined threshold may be determined by a user in advance. The one or more extracted keywords can be displayed on a display or printed.

In step 220, the computer terminates the process mentioned above.

According to an embodiment of the flowchart described in FIG. 2B, one or more dependency relations between an element included in an independent claim and a dependent claim can be used for extracting a keyword(s) and, therefore, an accuracy of extracting a keyword(s) can be further improved.

Figure 2C:
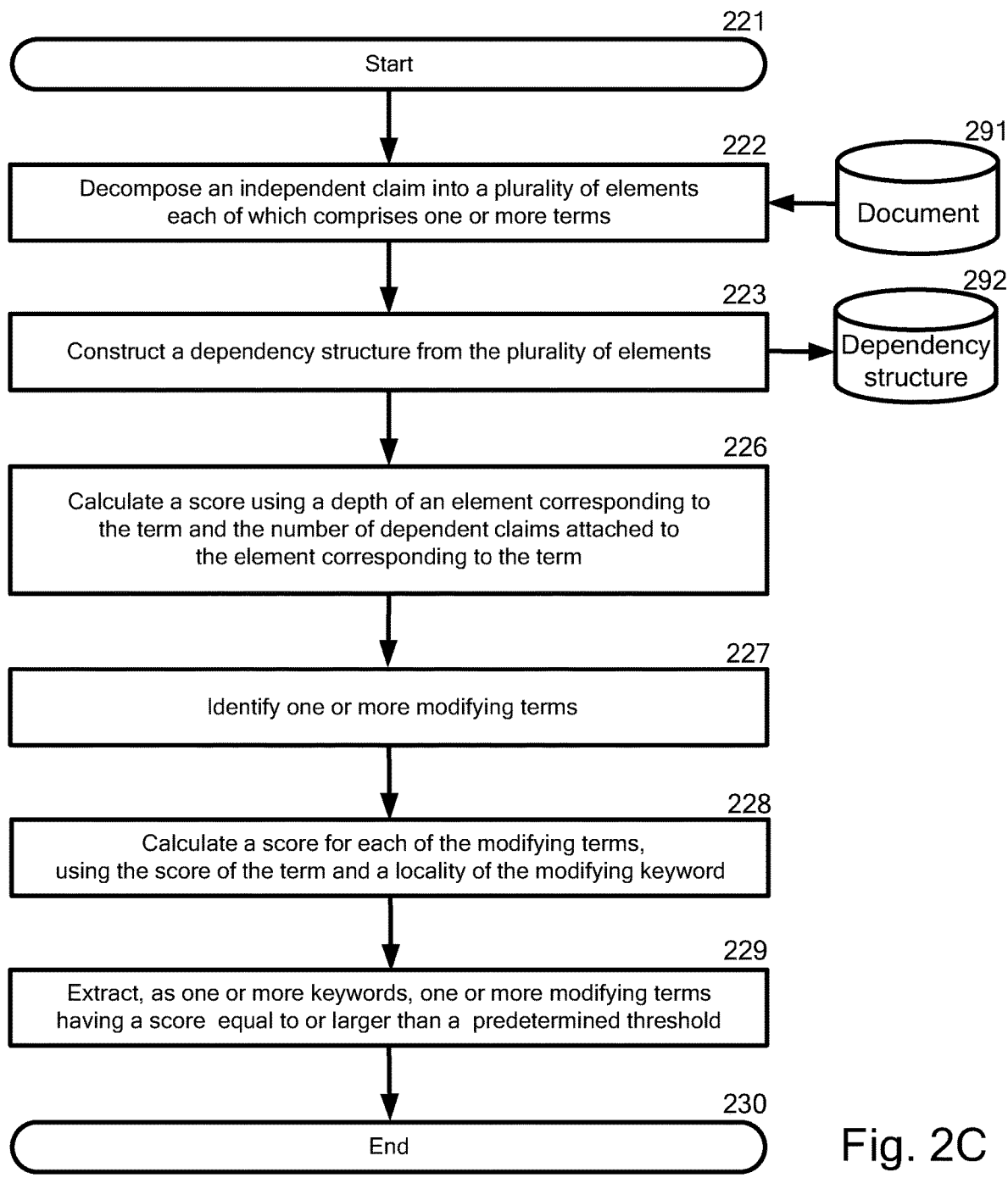

FIG. 2C illustrates one embodiment of a flowchart of a process for extracting one or more keywords in a claim, using an independent claim and a modifying term(s) together with a dependency structure which is constructed only from the independent claim.

In step 221, the computer starts the process for extracting one or more keywords in a claim. Each of steps 222, 223 and 226 corresponds to each of steps 202, 203 and 206, respectively. Accordingly, the overlapping explanations of steps 222, 223 and 226 are omitted here.

In step 227, the computer identifies one or more terms (that is, modifying terms) that modify each of the terms for which the score was calculated. One or more modifying terms m which modifies each $t_0$ are extracted so as to satisfy at least one of the following conditions: (A) modifying term m appears in the element $ET^{-1}(t_0)$; (B) m and $t_0$ appear in the same element e and there is no $ET^{-1}(t_0)$ in the independent claim; or (C) m and $t_0$ appear in the same element e and $d(e)=0$. An overlapping term $t_0$ can be also regarded as a modifying term m. The modifying term m which modifies $t_0$ is represented as $t_0 \in \text{Mod}(m)$ and $m \in \text{Mod}^{-1}(t_0)$. Please note that each of the mapping functions, Mod and $\text{Mod}^{-1}$, is a many to many mapping. One example of modifying terms will be explained below by referring to FIG. 6.

In step 228, the computer calculates a score for each of the one or more modifying terms, using the score of the term and a frequency index of the modifying term. The frequency index is an index of the degree to which the modifying term frequently appears among the plurality of elements. The frequency index may be calculated based on the number of elements which include the modifying term. One embodiment of the frequency index may be a ratio of the total number of the elements to the number of the elements which contain the modifying term, as defined the following equation (4).

$$fre(\omega) = \frac{|\{e_i\}|}{|\{e_i \mid e_i \ni \omega\}|} \quad \text{Equation (4)}$$

The score S(m) for each $$m \in \left\{ m \mid \bigcup_{t_0 \in T_0} \text{Mod}^{-1}(t_0) \right\}$$

may be calculated using the following equation (5):

$$Sp(m) = \max_{t_0 \in \text{Mod}(m)} fre(\omega) * S_{0p}(t_0) \quad \text{Equation (5)}$$

Where p=1 or 2 and, therefore, $S_{0p}$ denotes $S_{01}$ and $S_{02}$, in which Equations (2) and (3) above are used, respectively. Please note that $Sp(m)=0$ if $\text{Mod}(m)=\emptyset$.

In step 229, the computer extracts, as one or more keywords, one or more modifying terms having a score equal to or larger than a predetermined threshold. The predetermined threshold may be determined by a user in advance. The one or more extracted keywords can be displayed on a display or printed. The computer may further carry out the step 209 described in FIG. 2A to extract, as one or more keywords, one or more terms having a score equal to or larger than a predetermined threshold, together with the extraction of, as one or more keywords, one or more modifying terms having a score equal to or larger than a predetermined threshold.

In step 230, the computer terminates the process mentioned above.

According to an embodiment of the flowchart described in FIG. 2C, one or more modifying terms can be used for extracting a keyword(s) in addition to one or more dependency relations between elements included in an independent claim and, therefore, an accuracy of extracting a keyword(s) can be further improved.

Figure 2D:
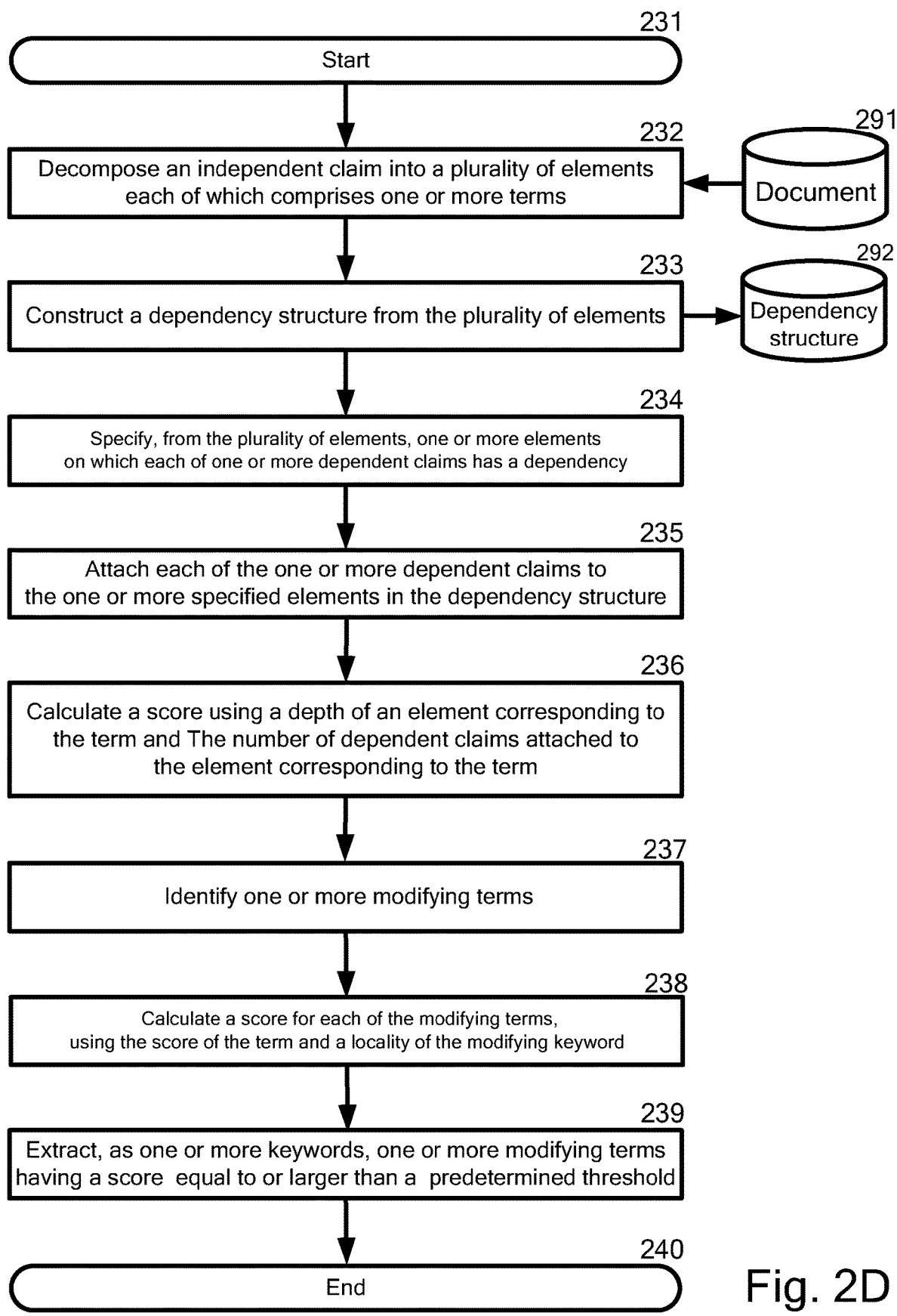

FIG. 2D illustrates one embodiment of a flowchart of a process for extracting one or more keywords in a claim, using an independent claim, its dependent claim(s) and a modifying terms together with a dependency structure which is constructed from the independent claim and its dependent claim(s).

In step 231, the computer starts the process for extracting one or more keywords in a claim. Each of steps 232 to 236 corresponds to each of steps 212 to 216, respectively. Accordingly, the overlapping explanations of steps 232 to 236 are omitted here. Each of steps 237 to 239 corresponds to each of steps 227 to 229, respectively. Accordingly, the overlapping explanations of steps 237 to 239 are omitted here. In step 240, the computer terminates the process mentioned above.

According to an embodiment of the flowchart described in FIG. 2D, one or more modifying terms can be used for extracting a keyword(s) in addition to one or more dependency relations between an element included in an independent claim and a dependent claim and, therefore, an accuracy of extracting a keyword(s) can be further improved.

Figure 2E:
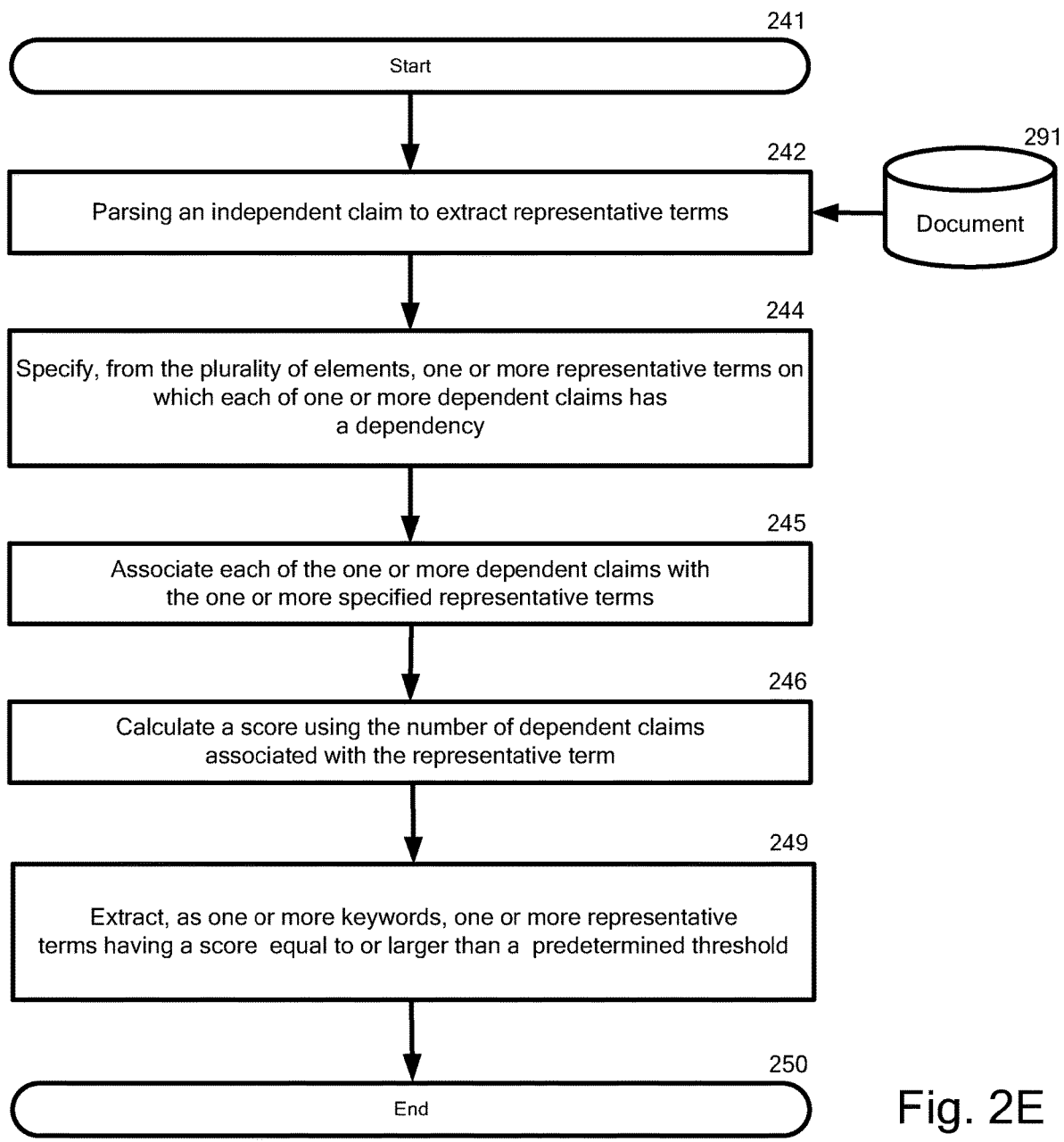

FIG. 2E illustrates one embodiment of a flowchart of a process for extracting one or more keywords in a claim, using an independent claim, its dependent claim(s) and a modifying term(s) together with a dependency structure which is constructed from the independent claim and its dependent claim(s).

In step 241, the computer starts the process for extracting one or more keywords in a claim.

In step 242, the computer parses an independent claim to extract representative terms. A method known in the art for parsing a text including an independent claim can be used. The representative terms may be a noun, a numeral, a verb, an adjective, or an adverb, or combination of these. The representative terms may have a possibility relating to a candidate for term(s) for a novelty or an inventive step.

In step 244, the computer specifies, from the plurality of the representative terms, one or more representative terms with which each of one or more dependent claims has a dependency relation. Where a term in the dependent claim overlaps with one or more terms (that is, overlapping terms) in the independent claims, the one or more terms in the independent claims are specified as the overlapping term with which each of one or more dependent claims has a dependency relation. The overlapping term may be the same term or similar term, as defined above.

In step 245, the computer associates each of the one or more dependent claims with the one or more specified representative terms.

In step 246, for each of representative terms in the independent claim, the computer calculates a score using the number of dependent claims associated with the representative term. The score may be calculated by a frequency index of the representative term. The frequency index may be an inverse ratio of the number of the representative words to the total number of the words in the independent claim.

In step 249, the computer extracts, as one or more keywords, one or more representative terms having a score equal to or larger than a predetermined threshold. The predetermined threshold may be determined by a user in advance. The one or more extracted keywords can be displayed on a display or printed.

In step 250, the computer terminates the process mentioned above.

According to an embodiment of the flowchart described in FIG. 2E, one or more dependency relations between a representative term included in an independent claim and a dependent claim can be used for extracting a keyword(s) and, therefore, an accuracy of extracting a keyword(s) can be improved.

Figure 3B:
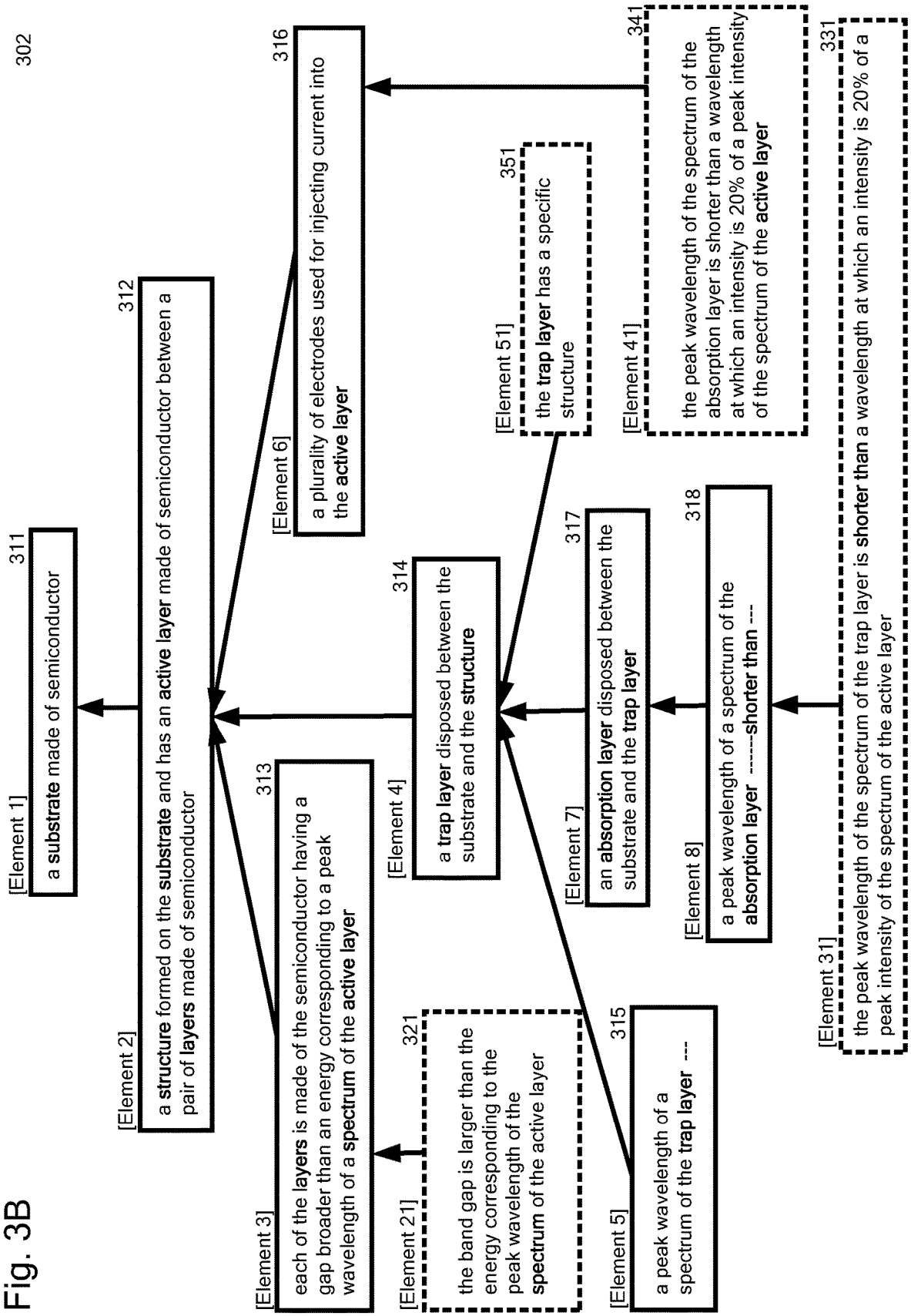
Figure 4:
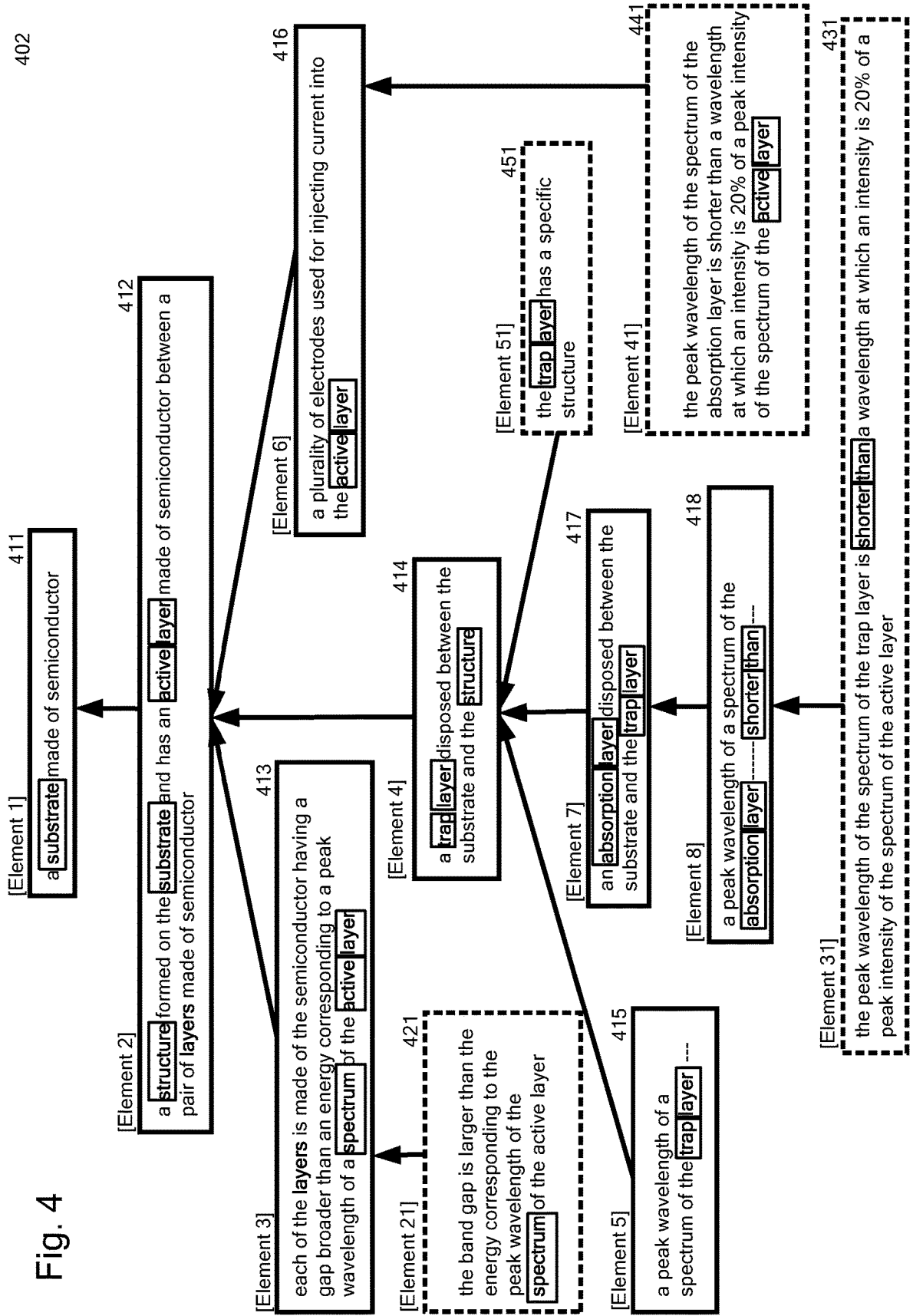
FIG. 4 illustrates one embodiment of the dependency structure illustrated in FIG. 3B and in which modifying terms are illustrated.

FIGS. 3A and 3B and FIG. 4 illustrate embodiments of a dependency structure which is made from an independent claim and optionally dependent claims.

In FIGS. 3A and 3B and FIG. 4, each of the dependency structure is constructed from an example of English claims including the independent claim 1 and optionally its dependent claims 2 to 5.

The example of claims 1 to 5 are as follows:

[Claim 1] A semiconductor device comprising:
a substrate made of a semiconductor;
a structure formed on the substrate and has an active layer made of semiconductor between a pair of layers made of semiconductor, wherein each of the layers is made of the semiconductor having a gap broader than an energy corresponding to a peak wavelength of a spectrum of the active layer;
a trap layer disposed between the substrate and the structure, wherein a peak wavelength of a spectrum of the trap layer is longer than a wavelength corresponding to a band gap of the substrate and the peak wavelength of the spectrum of the active layer;
a plurality of electrodes used for injecting current into the active layer; and
an absorption layer disposed between the substrate and the trap layer, wherein a peak wavelength of a spectrum of the absorption layer is longer than that corresponding to the band gap and shorter than the peak wavelength of the spectrum of the active layer.

[Claim 2] The semiconductor device according to claim 1, wherein the band gap is longer than the energy corresponding to the peak wavelength of the spectrum of the active layer.

[Claim 3] The semiconductor device according to claim 2, wherein the peak wavelength of the spectrum of the absorption layer is longer than a wavelength an intensity is 20% of a peak intensity of the spectrum of the active layer.

[Claim 4] The semiconductor device according to claim 1, wherein the peak wavelength of the spectrum of the trap layer is shorter than a wavelength at which an intensity is 20% of a peak intensity of the spectrum of the active layer.

[Claim 5] The semiconductor device according to claim 1, wherein the trap layer has a specific structure.

The computer first decomposes the independent claim 1 into Pre-elements 0 to 8, which are mentioned below. For example, the decomposition is made by the following symbols and punctuation marks (i.e., ":", ";", "," or ".").

Pre-elements 0 to 8 are as follows.
[Pre-element 0] a semiconductor device comprising:
[Pre-element 1] a substrate made of a semiconductor;
[Pre-element 2] a structure formed on the substrate and has an active layer made of semiconductor between a pair of layers made of semiconductor,
[Pre-element 3] wherein each of the layers is made of the semiconductor having a gap broader than an energy corresponding to a peak wavelength of a spectrum of the active layer;
[Pre-element 4] a trap layer disposed between the substrate and the structure,
[Pre-element 5] wherein a peak wavelength of a spectrum of the trap layer is longer than a wavelength corresponding to a band gap of the substrate and the peak wavelength of the spectrum of the active layer;
[Pre-element 6] a plurality of electrodes used for injecting current into the active layer; and
[Pre-element 7] an absorption layer disposed between the substrate and the trap layer,
[Pre-element 8] wherein a peak wavelength of a spectrum of the absorption layer is shorter than that corresponding to the band gap and shorter than the peak wavelength of the spectrum of the active layer.

Further, the computer may remove a claim preamble, [Pre-element 0]; symbols and punctuation marks mentioned above; the term, "and" and "or" which may be in the leading or rearward position; and a relative adverb which may be in the leading position, for example "wherein". Accordingly, Elements 1 to 8 mentioned below can be obtained.

Elements 1 to 8 are as follows.
[Element 1] a substrate made of a semiconductor
[Element 2] a structure formed on the substrate and has an active layer made of semiconductor between a pair of layers made of semiconductor
[Element 3] each of the layers is made of the semiconductor having a gap broader than an energy corresponding to a peak wavelength of a spectrum of the active layer
[Element 4] a trap layer disposed between the substrate and the structure
[Element 5] a peak wavelength of a spectrum of the trap layer is longer than a wavelength corresponding to a band gap of the substrate and the peak wavelength of the spectrum of the active layer
[Element 6] a plurality of electrodes used for injecting current into the active layer
[Element 7] an absorption layer disposed between the substrate and the trap layer
[Element 8] a peak wavelength of a spectrum of the absorption layer is shorter than that corresponding to the band gap and shorter than the peak wavelength of the spectrum of the active layer Accordingly, Elements 1 to 8 can be used in FIGS. 3A and 3B and FIG. 4 for constructing dependency structures.

Similarly, the computer may decompose each of the dependent claims 2 to 5 into a plurality of elements, using a method known in the art, and then, removes a claim citing parts in the leading part and symbols and punctuation marks mentioned above; the term, "and" and "or" which may be in the leading or rearward position; and a relative adverb which may be in the leading position, for example "wherein". Accordingly, Elements 21, 31, 41 and 51 can be obtained from claims 2 to 5, respectively.

Elements 21, 31, 41 and 51 are as follows.
[Element 21] the band gap is larger than the energy corresponding to the peak wavelength of the spectrum of the active layer

[Element 31] the peak wavelength of the spectrum of the trap layer is shorter than a wavelength at which an intensity is 20% of a peak intensity of the spectrum of the active layer
[Element 41] the peak wavelength of the spectrum of the absorption layer is shorter than a wavelength at which an intensity is 20% of a peak intensity of the spectrum of the active layer
[Element 51] the trap layer has a specific structure Accordingly, Elements 21, 31, 41 and 51 can be used in FIG. 3B and FIG. 4 for constructing dependency structures.

FIG. 3A illustrates one embodiment of a dependency structure which is made only from an independent claim. The computer constructs a dependency structure from Elements 1 to 8. FIG. 3A illustrates an exemplified dependency structure (301). The dependency structure (301) may be a tree structure.

Elements 1 (312) and 2 (312) have the same term, "substrate" and Element 1 (312) appears prior to Element 2 (312). Accordingly, Element 1 (312) is an upper node of Element 2 (312).

Elements 2 (312) and 3 (313) have the same term, "layers" and Element 2 (312) appears prior to Element 3 (313). Accordingly, Element 2 (312) is an upper node of Element 3 (313). Similarly, Elements 2 (312) and 6 (316) have the same term, "active layer" and Element 2 (312) appears prior to Element 6 (316). Accordingly, Element 2 (312) is an upper node of Element 6 (316).

Elements 2 (312) and 4 (314) have the same term, "structure" and Element 2 (312) appears prior to Element 4 (314). Accordingly, Element 2 (312) is an upper node of Element 4 (314).

Elements 4 (314) and 5 (315) have the same term, "trap layer" and Element 4 (314) appears prior to Element 5 (315). Accordingly, Element 4 (314) is an upper node of Element 5 (315).

Element 7 (317) has the term, "trap layer". The term, "trap layer" also appears Elements 4 (314) and 5 (315). Element 4 (314) is the upper node of Element 5 (315) and, therefore, the depth of Element 4 (314) is smaller than that of Element 5 (315). Accordingly, Element 4 (314) is an upper node of Element 7 (317) and Element 5 (315) is not an upper node of Element 7 (317).

Elements 7 (317) and 8 (318) have the same term, "absorption layer" and Element 7 (317) appears prior to Element 8 (318). Accordingly, Element 7 (317) is an upper node of Element 8 (318).

As a result, the dependency structure (301) is constructed.

FIG. 3B illustrates one embodiment of a dependency structure which is made from an independent claim and its dependent claims. After construction of the dependency structure (301), the computer attaches each of Elements 21, 31, 41 and 51 to the dependency structure (301).

Elements 3 (313) and 21 (321) have the same term, "spectrum" and Element 3 (313) which is decomposed from claim 1 appears prior to Element 3 (313). Accordingly, Element 21 (321) is attached to Element 3 (313).

Element 8 (318) and Element 31 (331) have the same term, "shorter than" and Element 8 (318) which is decomposed from claim 1 appears prior to Element 31 (331). Accordingly, Element 31 (331) is attached to Element 8 (318).

Element 6 (316) and Element 41 (341) have the same term, "active layer" and Element 6 (316) which is decomposed from claim 1 appears prior to Element 41 (341). Accordingly, Element 41 (341) is attached to Element 6 (316).

Element 51 (351) has the term, "trap layer". The term, "trap layer" appears Elements 4 (314) and 7 (318). The depth of Element 4 (314) is smaller than that of Element 7 (317). Accordingly, Element 51 (351) is attached to Element 4 (314) and Element 51 (351) is not attached to Element 7 (317).

As a result, the dependency structure (301) is updated to construct the dependency structure (302) in which Elements 21, 31, 41 and 51 were attached.

FIG. 4 illustrates one embodiment of modifying terms that modify each of the overlapping terms in the dependency structure. The dependency structure (402) corresponds to the dependency structure (302) described in FIG. 3B. The modifying terms are identified according to step 227 described in FIG. 2C or step 237 described in FIG. 2D. The modifying terms for each of t_o1 to t_o7 are as follows.

The overlapping terms and the modifying terms are as follows:
t_o1: substrate
Modifying terms m that modify t_o1:
substrate, semiconductor, structure, form, . . . , active, layer, . . . .
t_o2: active, layer
Modifying terms m that modify t_o2:
peak, wavelength, spectrum, active, layer, electrodes, . . . .
t_o3: structure
Modifying terms m that modify t_o3:
trap, . . . , structure, . . . .
t_o4: trap
Modifying terms m that modify t_o4:
peak, wavelength, spectrum, trap, . . . .
t_o5: peak, wavelength, spectrum
Modifying terms m that modify t_o5:
peak, wavelength, spectrum, layer, . . . .
t_o6: absorption
Modifying terms m that modify t_o6:
peak, wavelength, spectrum, absorption, layer, . . . , short, . . . .
t_o7: short
Modifying terms m that modify t_o7:
peak, wavelength, spectrum, absorption, layer, . . . , short, . . . .

Figure 5A:
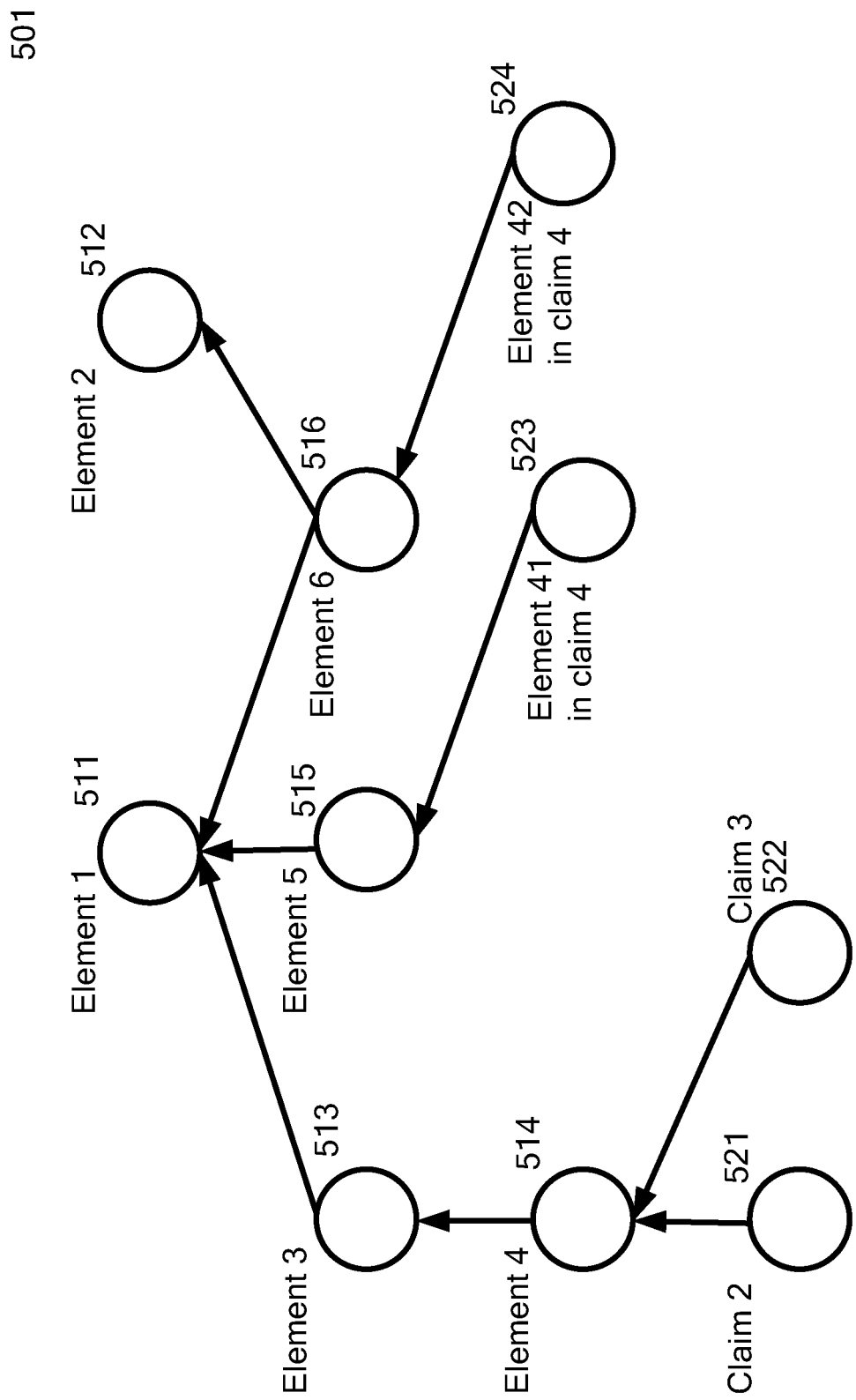
FIG. 5A illustrates one embodiment of an exemplified diagram of dependency structure.

FIG. 5A illustrates one embodiment of an exemplified diagram of dependency structure. Suppose that a document described an independent claim 1 and its dependent claims 2 to 4. The independent claim 1 is decomposed Element 1 to 6. The dependent claim 4 is decomposed Element 41 and Element 42. The computer constructs a dependency structure (501) from Elements 1 to 6, claim 2, claim 3 and Elements 41 and 42.

The dependency structure (501) has the following nodes: Element 1 to 6 (511, 512, 513, 514, 515 and 516), claim 2 (521), claim 3 (522), and Element 41 in claim 4 (523) and Element 42 in claim 524). Element 1 (511) and Element 2 (512) are top nodes. Element 1 (511) and Element 2 (512) has a common child node, Element 6 (516). Element 4 (514) has two child nodes, claim 2 (521) and claim 3 (523). Element 5 (515) has a child node, Element 41 (524) in claim 4. Element 6 (516) has a child node, Element 42 (524) in claim 4.

Figure 5B:
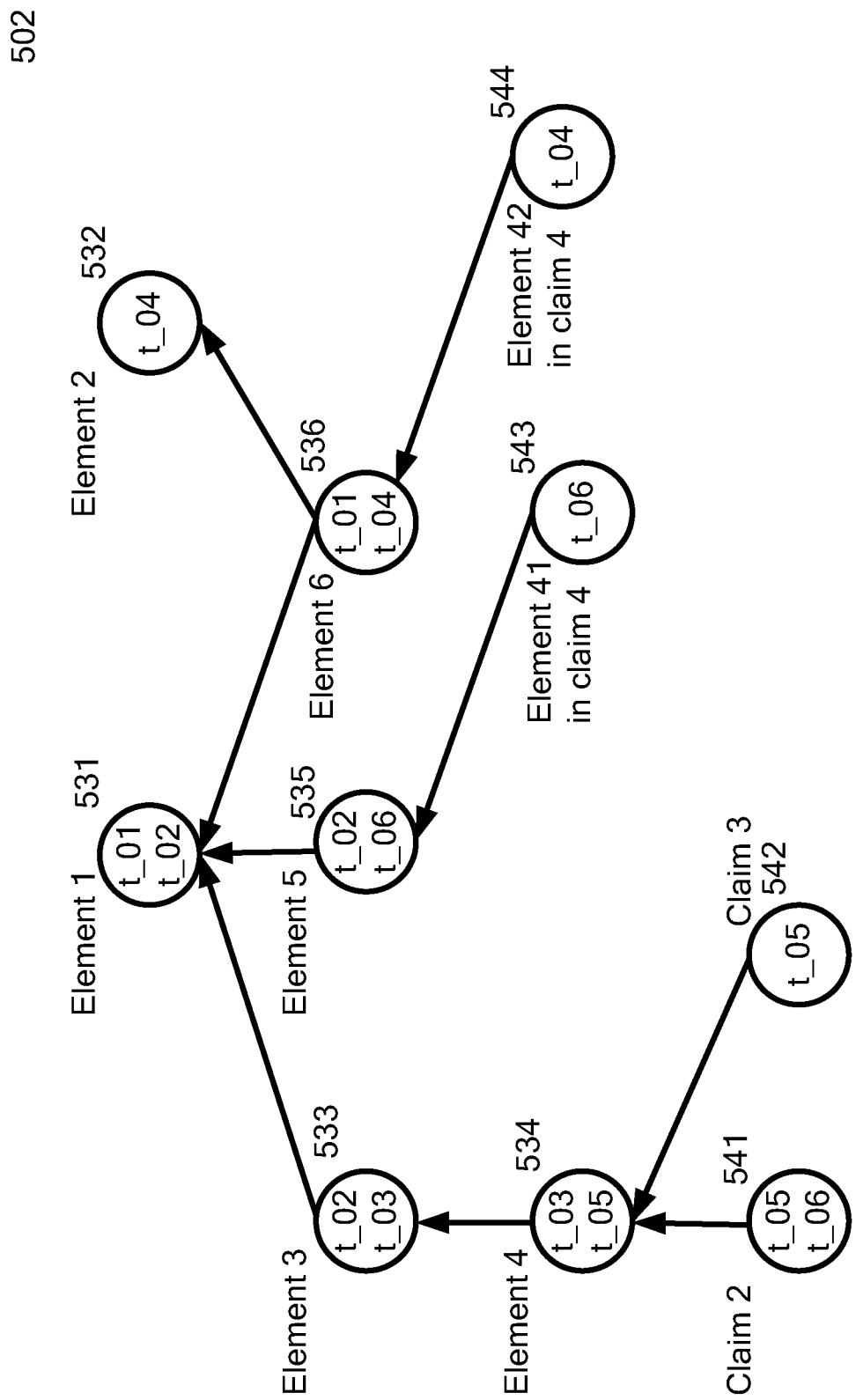
FIG. 5B illustrates one embodiment of an exemplified diagram of dependency structure in which overlapping terms are shown.

FIG. 5B illustrates one embodiment of an exemplified diagram of dependency structure in which overlapping terms are shown. The dependency structure (502) corresponds to the dependency structure (501) described in FIG. 5A. Suppose that the overlapping terms t_x, where x denotes a positive integer, are as follows: t_01, t_02, t_03, t_04, t_05, and t_06.

The overlapping term t_03 appears first in Element 3 (533), $e_3$, and second in Element 4 (534), $e_4$. Accordingly, parent ($e_4$)=$e_3$; and ET($e_4$)=t_03. The overlapping term t_05 appears first in Element 4 (534), $e_4$, and also in claim 2 (541). Accordingly, DT($e_4$)=t_05. The same applies also t_01, t_02, t_04, and t_06.

Figure 6:
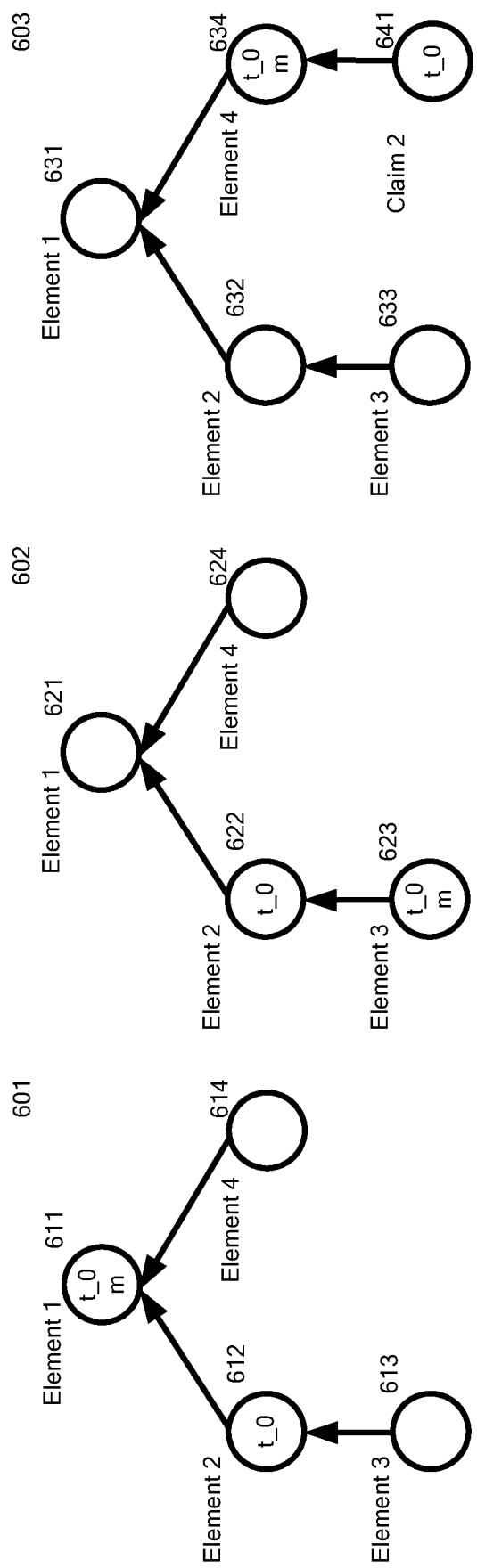
FIG. 6 illustrates an embodiment of an exemplified diagram of dependency structure in which modifying terms are shown.

FIG. 6 illustrates an embodiment of an exemplified diagram of dependency structure in which modifying terms are shown. The dependency structure (601) has Element 1 (611) and Element 2 (612) in which the overlapping term, t_0, is included. Element 1 (611) shows that the modifying term m is included. The dependency structure (602) has Element 2 (622) and Element 3 (623) in which the overlapping term, t_0, is included. Element 3 (623) shows that the modifying term m is included. The dependency structure (603) has Element 4 (634) and claim 2 (641) in which the overlapping term, t_0, is included. Element 4 (634) shows that the modifying term m is included. The dependency structures (601) satisfy the condition C mentioned above. The dependency structures (602) satisfy the condition A mentioned above. The dependency structures (603) satisfy the condition B mentioned above.

FIG. 7 illustrates a result obtained from an embodiment of the present invention. For making a corpus, the Japanese patent applications filed during Jun. 1 to Jun. 10 in 2005 are used. 285 Japanese patent applications are selected without limiting to any technical fields. The labeled correct keywords set is extracted as follows:

1. Prepare patent publications;
2. Prepare the corresponding laid-open patent publications;
3. Making sets of a patent publication and its corresponding laid-open patent publications and then filtering the sets by removing a set in which a Notice of Reasons for Rejection is not delivered in a prosecution or in which a set of claim is amended before a Notice of Reasons for Rejection is delivered;
4. For each of the remaining pair, retrieve one or more terms which appear in the independent claim described in the patent publication and not described in the corresponding independent claim described in the corresponding laid-open patent publication; and
5. Regard the retrieved terms as keywords relating to a novelty or an inventive step.

The following seven methods are used for experiments:

Example 1: the process according to FIG. 2B and $S_{o1}$ ($t_0$) described as Equation (2) is used for calculating a score;

Example 2: the process according to FIG. 2B and $S_{o2}$ ($t_0$) described as Equation (3) is used for calculating a score;

Comparative example 1: BM25;

Comparative example 2: BM25 per Element;

Comparative example 3: Frequency index described as Equation (4) above

Comparative example 4: Frequency index described as Equation (4)*Ele1;

Comparative example 5: Frequency index described as Equation (4)*Ele2;

Comparative examples 1 and 2 are used as a baseline. Comparative examples 3 to 5 are naïve approach compared to Examples 1 and 2.

For Comparative example 1: BM25 is a traditional keyword extraction approach. A BM25 score is calculated by BM ($\omega$). For calculating document frequency in BM25, other corpus containing patent applications filed before Jun. 1, 2005. This corpus has around 3 million patent applications.

For Comparative example 2: $S_{base2}$ ($\omega$) which is represented as Equation (9) mentioned below is used.

For Comparative example 3: Frequency index described as Equation (4) is used. The Frequency index is similar to Takaki's approach (see "Associative Document Retrieval by Query Subtopic Analysis and its Application to Invalidity Patent Search") while they also used element-wise score as well.

For Comparative example 4: $\sum_{e_i \ni \alpha} Fre(\omega) * \widetilde{S_{e_1}}(e_1)$ is used for calculating a score.

For Comparative example 5: $\sum_{e_i \ni \alpha} Fre(\omega) * \widetilde{S_{e_2}}(e_1)$ is used for calculating a score.

In the above comparisons, the two types of element-wise score referring to Takaki's approach mentioned above are used, which score can be represented as the following Equations (7) and (8).

$$\widetilde{S_{e_1}}(e_1) = \frac{1}{|e_1|} \sum_{\omega \in e_i} Fre(\omega) \qquad \text{Equation (7)}$$

$$\widetilde{S_{e_2}}(e_1) = \frac{1}{\log(|e_1|+1)} \sum_{\omega \in e_i} Fre(\omega) \qquad \text{Equation (8)}$$

The following simple extension of BM 25 is used, which can be represented as the following Equation (9).

$$S_{base2}(\omega) = ma \, \mathsf{X}_{e_i \ni \omega} \widetilde{S_{e_2}}(e_1) * BM_i(\omega) \qquad \text{Equation (9)}$$

The performance of extraction of keywords is compared using a score obtained by Mean Average Precision (MAP). The MAP is often used to evaluate the performance of information retrieval. The result is shown in Table (701). Table (701) shows that the significantly better results are obtained from Examples 1 and 2, compared to the Comparative examples 1 to 5.

The performance of extraction of keywords is compared using a precision, recall and f-measure with a criterion that the terms having a score over 90 percentile value are extracted. The result is shown in Table (702). In the precision, the results obtained from Examples 1 and 2 exceed the results obtained from the Comparative examples 1 to 5 with a wide margin. The result obtained from Comparative example 3 has the highest value in recall and f-measure. This is because the threshold of extracting one or more keywords is decided by percentile, and frequency index has many tie ranks compared to the whole samples (there are many terms that appear only in one element).

In Table (702), the result in uniform score having the same criteria in extracting keywords is added for reference. The uniform score shows high recall and high f-measure, which is without doubt meaningless. It is also nonsense to pick up so many keywords as important in keyword extraction. Considering this situation, unlike other tasks, the meaningful measure for this evaluation is a precision and not recall nor f-measure.

Figure 8A:
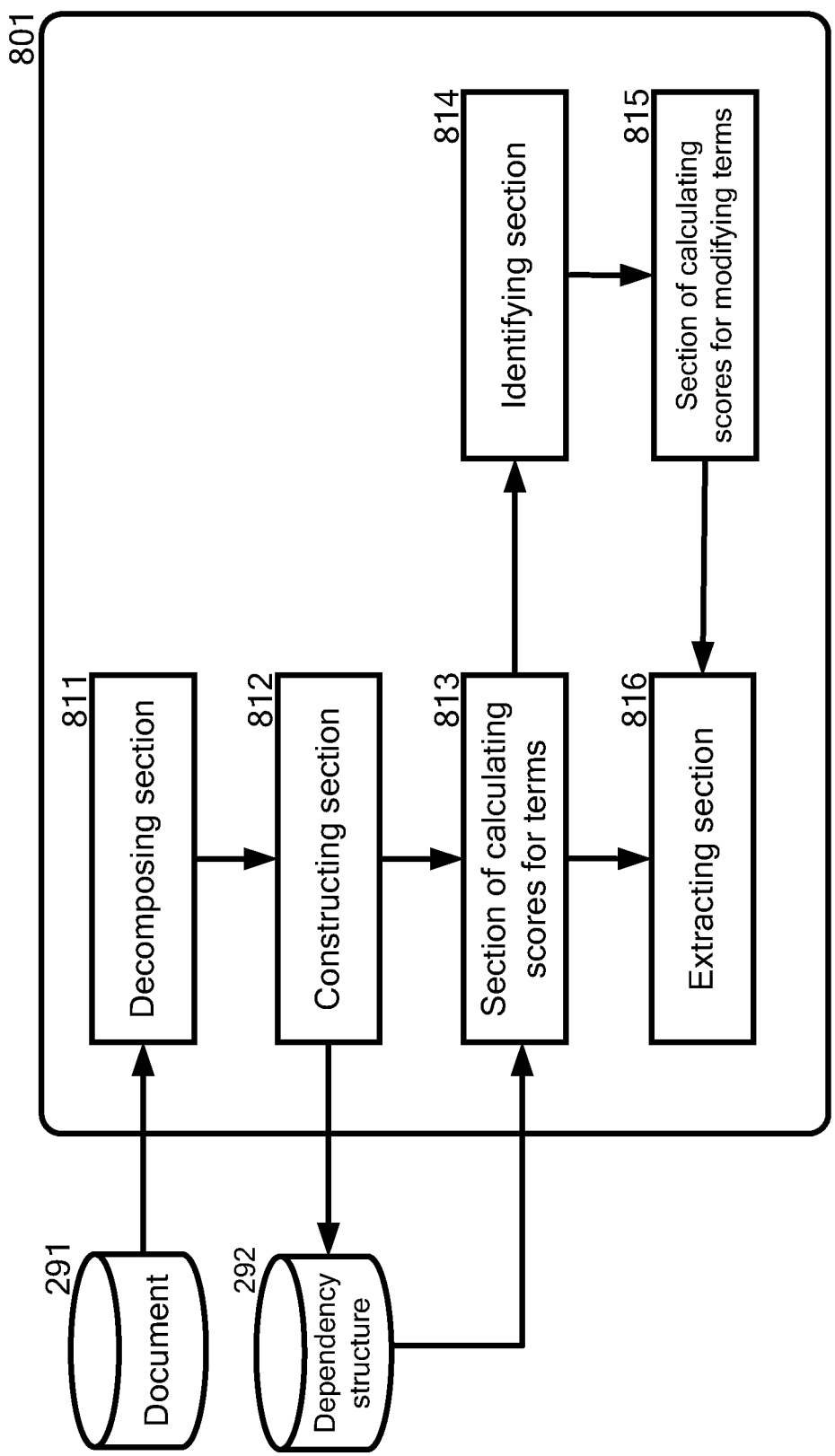
FIG. 8A illustrates an embodiment of an overall functional block diagram of a computer system hardware used in accordance with one embodiment of the flowcharts described in each of FIGS. 2A to 2D.
Figure 8B:
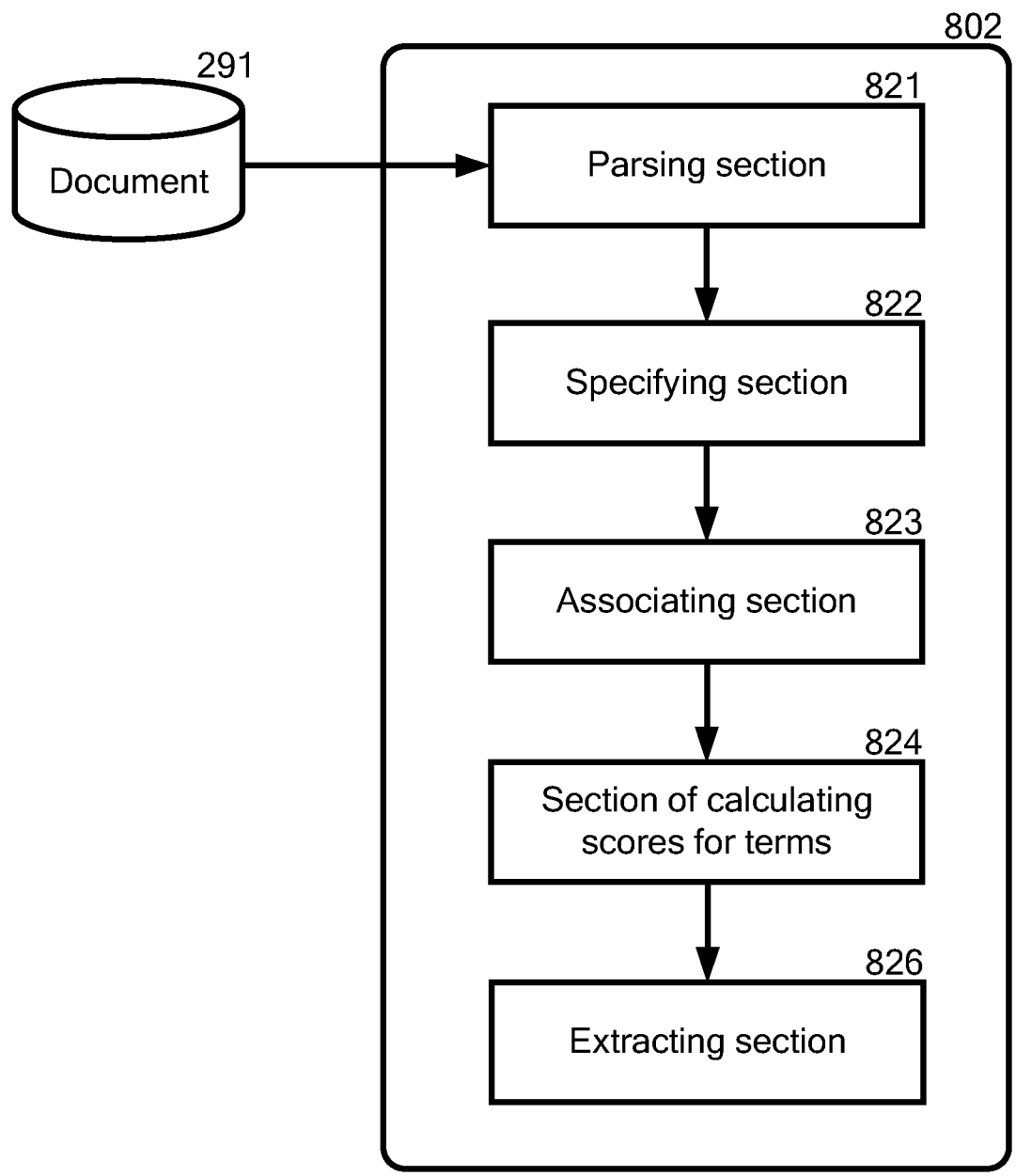
FIG. 8B illustrates an embodiment of an overall functional block diagram of a computer system hardware used in accordance with one embodiment of the flowcharts described in FIG. 2E.

FIGS. 8A and 8B illustrates an embodiment of an overall functional block diagram of a computer system hardware.

FIG. 8A illustrates an embodiment of an overall functional block diagram of a computer system hardware used in accordance with one embodiment of the flowcharts described in each of FIGS. 2A to 2D.

The computer (801) may correspond to the computer (101) described in FIG. 1.

The computer (801) includes a decomposing section (811), a constructing section (812), a section of calculating scores for terms (813) and an extracting section (816). The computer (801) may further include an identifying section (814) and a section of calculating scores for modifying terms (815).

The decomposing section (811) reads, into a memory such as a main memory (103) described in FIG. 1, a document from the storage (291) and then decomposes an independent claim into a plurality of elements each of which includes one or more terms. The decomposing section (811) may each of the dependent claims into a plurality of elements.

The decomposing section (811) may perform step 202 described in FIG. 2A, step 212 described in FIG. 2B, step 222 described in FIG. 2C, and step 232 described in FIG. 2D.

The constructing section (812) constructs a dependency structure from the plurality of elements. The constructing section (812) may further specify, from the plurality of elements, one or more elements with which each of one or more dependent claims has a dependency relation; and attach each of the one or more dependent claims to the one or more specified elements in the dependency structure. The constructing section (812) may attach each of the plurality of elements obtained by decomposing the dependent claims to the one or more specified elements in the dependency structure. The constructing section (812) may store the dependency relation into a storage (292).

The constructing section (812) may perform step 203 described in FIG. 2A, steps 213 to 215 described in FIG. 2B, step 223 described in FIG. 2C, and steps 233 to 235 described in FIG. 2D.

The section of calculating scores for terms (813) calculates, for each of terms in the independent claim, a score using a depth of an element corresponding to the term. The section of calculating scores for terms (813) may calculate, for each of terms in the independent claim, a score using a depth of an element corresponding to the term and the number of dependent claims attached to the element corresponding to the term.

The section of calculating scores for terms (813) may perform step 206 described in FIG. 2A, step 262 described in FIG. 2B, step 226 described in FIG. 2C, and step 236 described in FIG. 2D.

The extracting section (816) extracts, as one or more keywords, one or more terms having a score equal to or larger than a predetermined threshold. The extracting section (816) may one or more modifying terms having a score equal to or larger than a predetermined threshold in replace of the extraction of one or more terms or together with the extraction of one or more terms.

The extracting section (816) may perform step 209 described in FIG. 2A, step 219 described in FIG. 2B, step 229 described in FIG. 2C, and step 239 described in FIG. 2D.

The identifying section (814) identifies one or more terms that modify each of the terms for which the score was calculated (modifying term).

The identifying section (814) may perform step 227 described in FIG. 2C, and step 237 described in FIG. 2D.

The section of calculating scores for modifying terms (815) calculates a score for each of the one or more modifying terms, using the score of the term and a frequency index of the modifying term.

The section of calculating scores for modifying terms (815) may perform step 228 described in FIG. 2C, and step 238 described in FIG. 2D.

With reference now to FIG. 8B, FIG. 8B illustrates an embodiment of an overall functional block diagram of a computer system hardware used in accordance with one embodiment of the flowcharts described in FIG. 2E.

The computer (802) may correspond to the computer (101) described in FIG. 1.

The computer (802) includes a parsing section (821), a specifying section (822), an associating section (823), a section of calculating scores for terms (824) and an extracting section (826).

The parsing section (821) reads, into a memory such as a main memory (103) described in FIG. 1, a document from the storage (291) and then parses an independent claim to extract representative terms.

The parsing section (821) may perform step 242 described in FIG. 2E.

The specifying section (822) specifies, from the plurality of the representative terms, one or more representative terms with which each of one or more dependent claims has a dependency relation.

The specifying section (822) may perform step 244 described in FIG. 2E.

The associating section (823) associates each of the one or more dependent claims with the one or more specified representative terms.

The associating section (823) may perform step 245 described in FIG. 2E.

The section of calculating scores for terms (824) calculates, for each of representative terms in the independent claim, a score using the number of dependent claims associated with the representative term.

The section of calculating scores for terms (824) may perform step 246 described in FIG. 2E.

The extracting section (826) extracts, as one or more keywords, one or more representative terms having a score equal to or larger than a predetermined threshold.

The extracting section (826) may perform step 249 described in FIG. 2E.

The present invention may be a method, a system, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In another optional embodiment according to claim 2, the method may further includes specifying, from the plurality of elements, one or more elements with which each of one or more dependent claims has a dependency relation; and attaching each of the one or more dependent claims to the one or more specified elements in the dependency structure, and, in the step of calculating a score, a score is calculated using the number of dependent claims attached to the element corresponding to the term in addition to the depth of the element corresponding to the term.

In another optional embodiment according to claim 3 or 4 which depends on claim 1 or 2, respectively, the method further including: identifying one or more terms that modify each of the terms for which the score was calculated (modifying term); and calculating a score for each of the one or more modifying terms, using the score of the term and a frequency index of the modifying term, the frequency index being an index of the degree to which the modifying term appears among the plurality of elements; one or more modifying terms having a score equal to or larger than a predetermined threshold being extracted as one or more keywords in replace of the extraction of one or more terms or together with the extraction of one or more terms.

A patent publication has a strict structure. There are a title, an abstract, a claim(s) and a body. Among them, a claim(s) is the most important part where all of the necessary contents for the invention are described.

According to an embodiment of the present invention according to claim 1, one or more dependency relations between elements included in an independent claim can be used for extracting a keyword(s) and, therefore, an accuracy of extracting a keyword(s) can be improved.

According to an optional embodiment of the present invention according to claim 2, one or more dependency relations between an element included in an independent claim and a dependent claim can be used for extracting a keyword(s) and, therefore, an accuracy of extracting a keyword(s) can be further improved.

According to an optional embodiment of the present invention according to claim 3, one or more modifying terms can be used for extracting a keyword(s) in addition to one or more dependency relations between elements included in an independent claim and, therefore, an accuracy of extracting a keyword(s) can be further improved.

According to an optional embodiment of the present invention according to claim 4, one or more modifying terms can be used for extracting a keyword(s) in addition to one or more dependency relations between an element included in an independent claim and a dependent claim and, therefore, an accuracy of extracting a keyword(s) can be further improved.

According to another embodiment of the present invention according to claim 17, one or more dependency relations between a representative term included in an independent claim and a dependent claim can be used for extracting a keyword(s) and, therefore, an accuracy of extracting a keyword(s) can be improved.

By the expression "a/one" should be understood as "at least one".

By the expression "include(s)/including a/one" should be understood as "include(s)/including at least one".

By the expression "include(s)/including" should be understood as "include(s)/including at least".

By the expression "/" should be understood as "and/or".

What is claimed is:

1. A computer-implemented method for extracting at least one keyword in a patent claim, the method comprising:
    decomposing an independent claim into a plurality of elements, wherein each element in the plurality of elements has at least one term, wherein the at least one term is a noun, a numeral, a verb, an adjective, or an adverb, or combination of these;
    constructing a dependency structure from the plurality of elements, wherein each element in the plurality of elements has a depth in the dependency structure;
    calculating a score using the depth of the element corresponding to the at least one term in the independent claim; and
    extracting at least one keyword from the at least one term having a score equal to or larger than a predetermined threshold;
    wherein if at least one element among the plurality of elements is similar to an element in a dependent claim, the at least one element in the plurality of elements is specified, and attaching at least one dependent claim to the at least one specified element in the dependency structure.

2. The method according to claim 1, the method further comprising:
    specifying at least one element in the plurality of elements with a dependency relation with at least one dependent claim;
    attaching at least one dependent claim to the at least one specified element m the dependency structure; and
    calculating a score using the number of dependent claims attached to the at least one element corresponding to the term and the depth of the element corresponding to the term.

3. The method according to claim 2, the method further comprising:
    identifying at least one modifying term that modifies the at least one term for which the score was calculated;
    calculating a score for each of the at least one modifying terms using the score of the at least one term and a frequency index of the modifying term, wherein the frequency index is an index of the degree to which the modifying term appears among the plurality of elements; and
    if the at least one modifying terms has a score that is equal to or larger than a predetermined threshold, extracting the at least one modifying terms as at least one keyword in place of or together with the previously extracted at least one keyword.

4. The method according to claim 3, wherein the term which is used for calculating the score for the modifying term belongs to an element appearing first in the sequential order of texts of the independent claim among the elements having the term.

5. The method according to claim 3, wherein the frequency index is calculated based on the number of elements which have the modifying term.

6. The method according to claim 3, wherein the frequency index is a ratio of the total number of the elements to the number of the elements which contain the modifying term.

7. The method according to claim 2, wherein the term which is used for calculating the score for the modifying term belongs to an element appearing first in the sequential order of texts of the independent claim among the elements having the term.

8. The method according to claim 2, wherein if a term in the dependent claim overlaps with at least one term in the element (hereinafter referred to as "overlapping term"), one or more elements having the overlapping terms are specified.

9. The method according to claim 8, wherein if the overlapping term exists in more than one element among the plurality of elements, the element appearing first in the sequential order of texts of the independent claim among the plurality of elements having the overlapping term is specified.

10. The method according to claim 2, wherein if at least one term in the element are similar to the term in the dependent claim, the elements having the similar terms are specified in place of or together with the elements having the same terms.

11. The method according to claim 10, wherein if the similar term exists in a plurality of elements, the element appearing first in the sequential order of texts of the independent claim is specified among the plurality of elements.

12. The method according to claim 1, the method further comprising:
    identifying at least one modifying term that modifies each of the at least one terms for which the score was calculated;
    calculating a score for each of the at least one modifying terms using the score of the at least one term and a frequency index of the modifying term, wherein the frequency index is an index of the degree to which the modifying term appears among the plurality of elements; and
    if the at least one modifying terms has a score that is equal to or larger than a predetermined threshold, extracting the at least one modifying terms as at least one keyword in place of or together with the previously extracted at least one keyword.

13. The method according to claim 1, wherein if at least one elements among the plurality of elements is similar to an element in a dependent claim, the at least one element in the plurality of elements is specified.

14. The method according to claim 1, wherein each dependent claim is decomposed into a plurality of elements such that each element in the plurality of elements is attached to at least one specified element in the dependency structure.

15. The method according to claim 1, wherein a preamble of the independent claim is removed in constructing the dependency structure.

16. A computer program product for extracting at least one keyword in a patent claim, the computer program product comprising a computer usable storage medium having program instructions embodied therewith, wherein the computer readable storage medium is not a transitory signal per se, the program instructions executable by a computer to cause the computer to perform a method comprising:
parsing an independent claim to extract representative terms, wherein each representative term in the plurality of representative terms is a noun, numeral, verb, adjective or adverb;
specifying at least one representative term in the plurality of the representative terms having a dependency relation with each of the at least one dependent claims;
associating each of the at least one dependent claims with the at least one specified representative terms;
calculating a score using the number of dependent claims associated with the representative term for each representative term in the independent claim; and
extracting at least one keyword from the at least one representative terms having a score equal to or larger than a predetermined threshold;
wherein if at least one element among the plurality of elements is similar to an element in a dependent claim, the at least one element in the plurality of elements is specified, and attaching at least one dependent claim to the at least one specified element in the dependency structure.

17. A computer-implemented method for extracting one or more keywords in a patent claim, the method comprising:
parsing an independent claim to extract a plurality of representative terms, wherein each representative term in the plurality of representative terms is a noun, a numeral, a verb, an adjective, or an adverb, or combination of these;
specifying at least one representative term in the plurality of representative terms having a dependency relation with each of the at least one dependent claims;
associating each of the at least one dependent claims with the at least one specified representative terms;
calculating a score using the number of dependent claims associated with the representative term for each representative term in the independent claim; and
extracting at least one keyword from the at least one representative terms having a score equal to or larger than a predetermined threshold;
wherein if at least one element among the plurality of elements is similar to an element in a dependent claim, the at least one element in the plurality of elements is specified, and attaching at least one dependent claim to the at least one specified element in the dependency structure.

18. The method according to claim 17, wherein a score is calculated using a frequency index of the representative term, wherein the frequency index is an inverse ratio of the number of the representative terms to the total number of words in the independent claim.

19. A system, comprising:
a memory;
a processor communicatively coupled to the memory; and
a module for extracting one or more keywords in a patent claim, configured to carry out the steps of a method comprising:
decomposing an independent claim into a plurality of elements, wherein each element in the plurality of elements has at least one term, wherein the at least one term is a noun, a numeral, a verb, an adjective, or an adverb, or combination of these;
constructing a dependency structure from the plurality of elements, wherein each element in the plurality of elements has a depth in the dependency structure;
calculating a score using the depth of the element corresponding to the at least one term in the independent claim; and
extracting at least one keyword from at least one term having a score equal to or larger than a predetermined threshold;
wherein if at least one element among the plurality of elements is similar to an element in a dependent claim, the at least one element in the plurality of elements is specified, and attaching at least one dependent claim to the at least one specified element in the dependency structure.

20. The system according to claim 19, the operation further comprising:
specifying at least one element in the plurality of elements with a dependency relation with at least on dependent claim;
attaching at least one dependent claim to the at least one specified element m the dependency structure;
calculating a score using the number of dependent claims attached to the at least one element corresponding to the term and the depth of the element corresponding to the term.

21. The system according to claim 20, the operation further comprising:
identifying at least one modifying terms that modifies each of the at least one terms for which the score was calculated;
calculating a score for each of the at least one modifying terms using the score of the at least one term and a frequency index of the modifying term, wherein the frequency index is an index of the degree to which the modifying term appears among the plurality of elements; and
if the at least one modifying terms has a score that is equal to or larger than a predetermined threshold, extracting the at least one modifying terms as at least one keyword in place of or together with the previously extracted at least one keyword.

22. A computer program product for extracting at least one keyword in a patent claim, the computer program product comprising a computer usable storage medium having program instructions embodied therewith, wherein the computer readable storage medium is not a transitory signal per se, the program instructions executable by a computer to cause the computer to perform a method comprising:

decomposing an independent claim into a plurality of elements, wherein each element in the plurality of elements has at least one term, wherein the at least one term is a noun, a numeral, a verb, an adjective, or an adverb, or combination of these;

constructing a dependency structure from the plurality of elements, wherein each element in the plurality of elements has a depth in the dependency structure;

calculating a score using the depth of an element corresponding to the at least one term in the independent claim; and extracting at least one keyword from the at least one term having a score equal to or larger than a predetermined threshold;

wherein if at least one element among the plurality of elements is similar to an element in a dependent claim, the at least one element in the plurality of elements is specified, and attaching at least one dependent claim to the at least one specified element in the dependency structure.

23. The computer program product according to claim 22, the method further comprising:

specifying at least one element in the plurality of elements with a dependency relation with at least one dependent claim;

attaching at least one dependent claim to the at least one specified element m the dependency structure;

calculating a score using the number of dependent claims attached to the at least one element corresponding to the term and the depth of the element corresponding to the term.

24. The computer program product according to claim 23, the method further comprising: identifying at least one modifying term that modifies each of the at least one terms for which the score was calculated;

calculating a score for each of the at least one modifying terms using the score of the at least one term and a frequency index of the modifying term, wherein the frequency index is an index of the degree to which the modifying term appears among the plurality of elements; and if the at least one modifying term has a score that is equal to or larger than a predetermined threshold, extracting the at least one modifying terms as at least one keyword in place of or together with the previously extracted at least one keyword.

* * * * *